United States Patent [19]

Woebcke et al.

[11] 4,318,800
[45] Mar. 9, 1982

[54] THERMAL REGENERATIVE CRACKING (TRC) PROCESS

[75] Inventors: Herman N. Woebcke, Stamford, Conn.; Arju H. Bhojwani, Lawrenceville, N.J.; Robert J. Gartside, Auburndale, Mass.; Axel R. Johnson, North Babylon, N.Y.

[73] Assignee: Stone & Webster Engineering Corp., Boston, Mass.

[21] Appl. No.: 165,782

[22] Filed: Jul. 3, 1980

[51] Int. Cl.³ .............................................. C10G 9/32
[52] U.S. Cl. ..................................... 208/127; 208/161
[58] Field of Search ............... 208/127, 152, 153, 161, 208/168

[56] References Cited

U.S. PATENT DOCUMENTS

| 2,439,811 | 4/1948 | Jewell | 208/161 |
| 4,061,562 | 12/1977 | McKinney | 208/127 |
| 4,097,363 | 6/1978 | McKinney | 208/127 |

Primary Examiner—T. M. Tufariello
Attorney, Agent, or Firm—Hedman, Casella, Gibson & Costigan

[57] ABSTRACT

An improved Thermal Regenerative Cracking (TRC) apparatus and process includes: (1) an improved low residence time solid-gas separation device and system; and (2) an improved solids feeding device and system; as well as an improved sequential thermal cracking process; an improved solids quench boiler and process; an improved preheat vaporization system; and an improved fuel gas generation system for solids heated. One or more of the improvements may be incorporated in a conventional TRC system.

29 Claims, 29 Drawing Figures

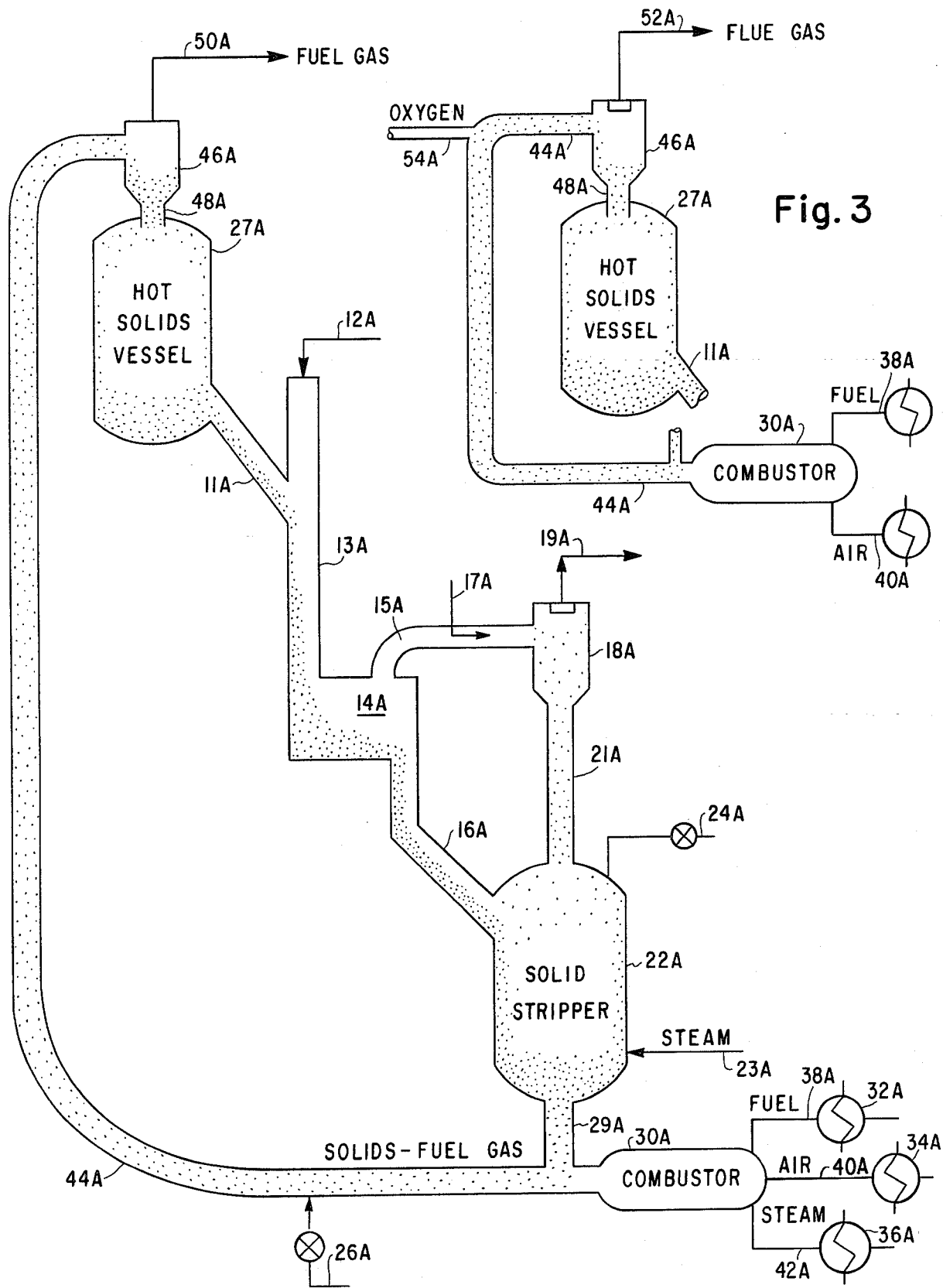

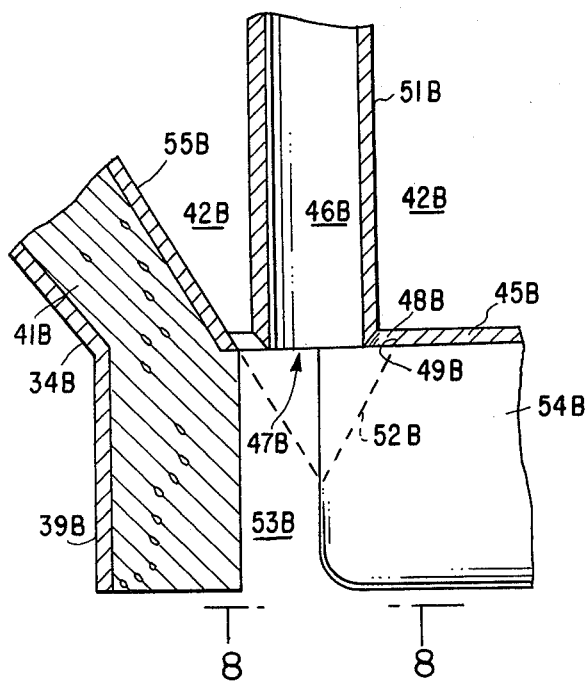
Fig. 5
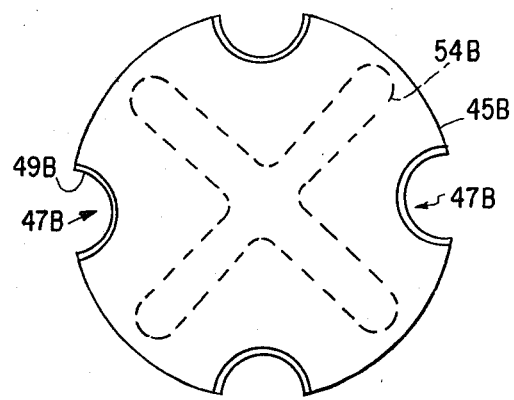
Fig. 6
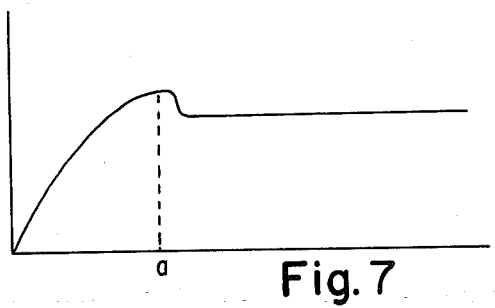
Fig. 7
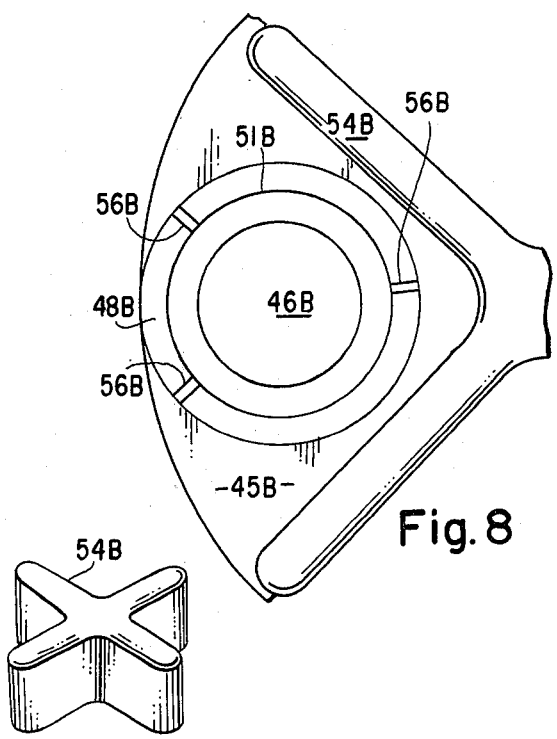
Fig. 8
Fig. 9

THERMAL REGENERATIVE CRACKING (TRC) PROCESS

CROSS REFERENCE TO RELATED CASES

This application is related to the following applications:

(1) U.S. Application Ser. No. 06/055,148, filed July 8, 1979, and the continuation-in-part thereof, Application Ser. No. 06/165,781, filed July 3, 1980.

(2) U.S. Application Ser. No. 06/086,951, filed Oct. 22, 1979, and the continuation-in-part thereof, Application Ser. No. 06/165,786, filed July 3, 1980.

(3) U.S. Application Ser. No. 06/082,049, filed Oct. 5, 1979, now U.S. Pat. No. 4,268,375, issued May 19, 1981, and the continuation-in-part thereof, Application Ser. No. 06/178,942, filed Aug. 15, 1980.

(4) U.S. Application Ser. No. 06/082,162, filed Oct. 5, 1979, and the continuation-in-part thereof, Application Ser. No. 06/165,784, filed July 3, 1980.

(5) U.S. Application Ser. No. 06/081,126, filed Oct. 2, 1979, now U.S. Pat. No. 4,264,432, issued on Apr. 28, 1981, and the continuation-in-part thereof, Application Ser. No. 06/165,783, filed July 3, 1980.

(6) U.S. Application Ser. No. 06/082,048, filed Oct. 5, 1979, and the continuation-in-part thereof, Application Ser. No. 06/178,941, filed Aug. 15, 1980.

The present invention relates to improvements in Thermal Regenerative Cracking (TRC) apparatus and process, as described in U.S. Pat. Nos. 4,061,562 and 4,097,363 to McKinney et al, the disclosures of which are incorporated herein by reference. More particularly, the subject invention basically provides, in a TRC apparatus and process, the following:

(1) an improved low residence time solid-gas separation device and system; and
(2) an improved solids feeding device and system.

Still further, the subject invention provides an improved sequential thermal cracking process; an improved solids quench boiler and process; an improved preheat vaporization system; and an improved fuel gas generation system for solids heating. One or more of the latter improvements may be incorporated in the above mentioned improved TRC system.

DESCRIPTION OF THE DRAWINGS

FIG. 2 is a schematic diagram of the fuel gas generation system and process of the subject invention.

FIG. 3 is an alternative embodiment wherein the fuel gas is burned to flue gas to provide additional heat for the particulate solids.

FIG. 5 is an enlarged view of the intersection of the solid and gas phases within the mixing zone of the reaction chamber.

FIG. 6 is a top view of the preferred plate geometry, said plate serving as the base of the gas distribution chamber.

FIG. 7 is a graph of the relationship between bed density, pressure drop, bed height and aeration gas velocity in a fluidized bed.

FIG. 8 is a view through line 8—8 of FIG. 5.

FIG. 9 is an isometric view of the plug which extends into the mixing zone to reduce flow area.

DESCRIPTION OF THE PREFERRED EMBODIMENTS

Figure 1:
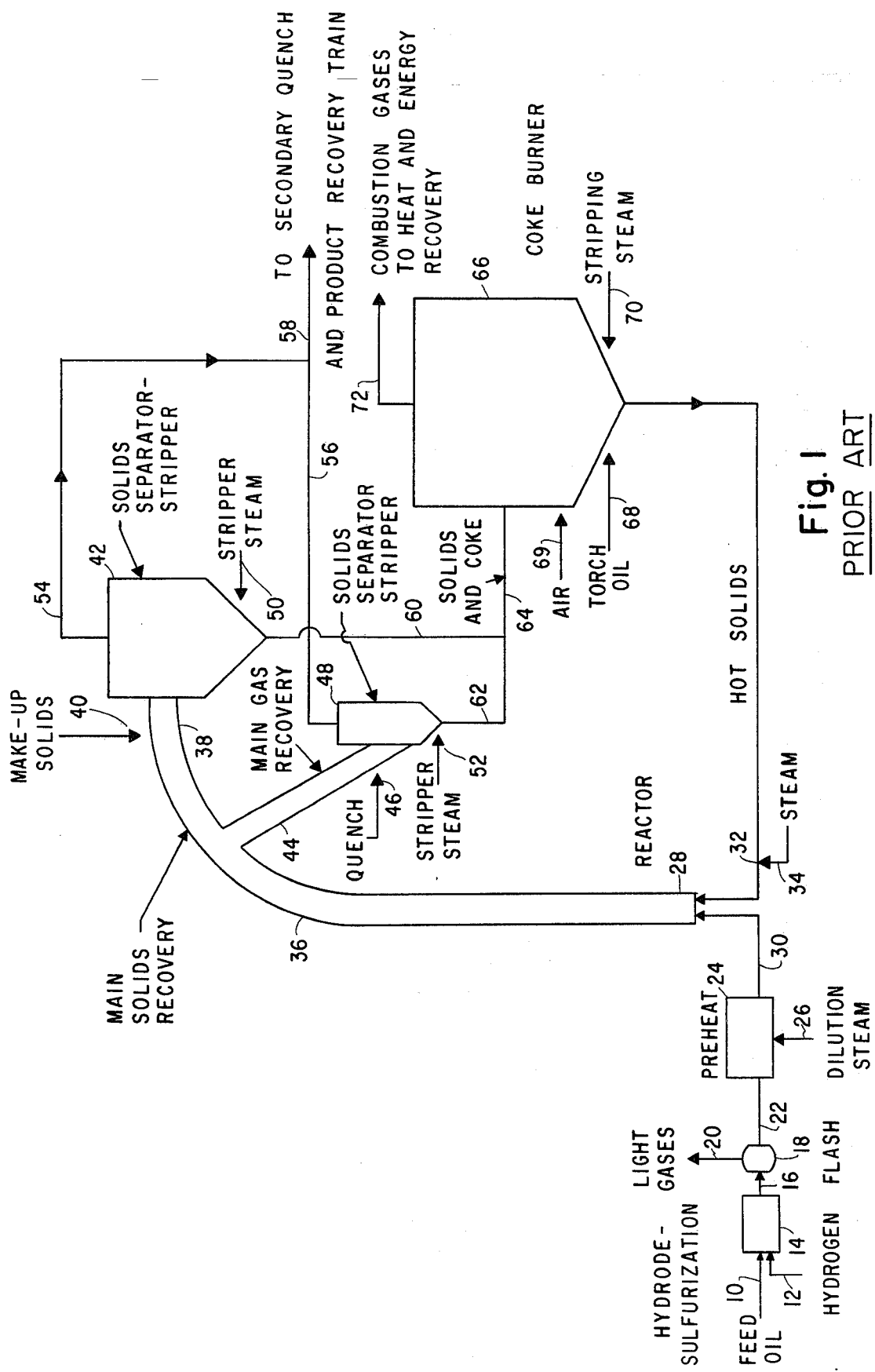
FIG. 1 is a schematic diagram of a TRC system and process according to the prior art.

The improvements of the subject invention are embodied in the environment of a thermal regeneration cracking reactor (TRC) which is illustrated in FIG. 1.

Referring to FIG. 1, in the prior art TRC process and system, thermal cracker feed oil or residual oil, with or without blended distillate heavy gas, entering through line 10 and hydrogen entering through line 12 pass through hydrodesulfurized zone 14. Hydrosulfurization effluent passes through line 16 and enters flash chamber 19 from which hydrogen and contaminating gases including hydrogen sulfide and ammonia are removed overhead through line 20, while flash liquid is removed through line 22. The flash liquid passes through preheater 24, is admixed with dilution steam entering through line 26 and then flows to the bottom of thermal cracking reactor 28 through line 30.

A stream of hot regenerated solids is charged through line 32 and admixed with steam or other fluidizing gas entering through line 34 prior to entering the bottom of riser 28. The oil, steam and hot solids pass in entrained flow upwardly through riser 28 and are discharged through a curved segment 36 at the top of the riser to induce centrifugal separation of solids from the effluent stream. A stream containing most of the solids passes through riser discharge segment 38 and can be mixed, if desired, with make-up solids entering through line 40 before or after entering solids separator-stripper 42. Another stream containing most of the cracked product is discharged axially through conduit 44 and can be cooled by means of a quench stream entering through line 46 in advance of solids separator-stripper 48.

Stripper steam is charged to solids separators 42 and 48 through lines 50 and 52, respectively. Product streams are removed from solids separators 42 and 48 through lines 54 and 56, respectively, and then combined in line 58 for passage to a secondary quench and product recovery train, not shown. Coke-laden solids are removed from solids separators 42 and 48 through lines 60 and 62, respectively, and combined in line 64 for passage to coke burner 66. If required, torch oil can be added to burner 66 through line 68 while stripping steam may be added through line 70 to strip combustion gases from the heated solids. Air is charged to the burner through line 69. Combustion gases are removed from the burner through line 72 for passage to heat and energy recovery systems, not shown, while regenerated hot solids which are relatively free of coke are removed from the burner through line 32 for recycle to riser 28. In order to produce a cracked product containing ethylene and molecular hydrogen, petroleum residual oil is passed through the catalytic hydrodesulfurized zone in the presence of hydrogen at a temperature between 650° F. and 900° F., with the hydrogen being chemically combined with the oil during the hydrocycling step. The hydrodesulfurized residual oil passes through the thermal cracking zone together with the entrained inert hot solids functioning as the heat source and a diluent gas at a temperature between about 1300° F. and 2500° F. and a residence time between about 0.05 to 2 seconds to produce the cracked product and ethylene and hydrogen. For the production of ethylene by thermally cracking a hydrocarbon feed at least 90 volume percent of which comprises light gas oil fraction of a crude oil boiling between 400° F. and 650° F., the hydrocarbon feed, along with diluent gas and entrained inert hot gases are passed through the cracking zone at a temperature between 1300° F. and 2500° F. at a residence time of 0.05 to 2 seconds. The weight ratio of oil gas to fuel oil is at least 0.3, while the cracking severity corresponds to a methane yield of at least 12 weight percent based on said feed oil. Quench cooling of the product immediately upon leaving the cracked zone to a temperature below 1300° F. ensures that the ethylene yield is greater than the methane yield on a weight basis.

(a) Improved Fuel Gas Generation For Solids Heating

FIG. 2 illustrates the improved process and system of the invention as may be embodied in a prior art TRC system, in lieu of the coke burner 66 (FIG. 1). Particulate solids and hydrocarbon feed gas enter a tubular reactor 13A through lines 11A and 12A respectively.

The cracked effluent from the tubular reactor 13A is separated from the particulate solids in a separator 14A and quenched in line 15A by quench material injected from line 17A. The solids separated from the effluent are delivered through line 16A to a solids separator. The residual solids are removed from the quenched product gas in a secondary separator 18A and delivered to the solids stripper 22A. The solids-free product gas is taken overhead from the secondary separator 18A through line 19A.

The particulate solids in the solids stripper 22A, having delivered heat during the thermal cracking in the tubular reactor 13A, must be reheated and returned to the tubular reactor 13A to continue the cracking process.

The particulate solids prior to being reheated, are stripped of gas in the solid stripper 27A by steam delivered to the solids stripper 22A through line 23A.

After the particulate solids have been stripped of gas impurities in the solids stripper 22A, the particulates solids are at a temperature of about 1,450° F.

The fuel gas generation apparatus of the invention consists of a combustion vessel 30A, and pre-heat equipment for fuel, air (or $O_2$) and steam which are delivered to the combustion vessel 30A. Pre-heaters 32A, 34A, and 36 are shown in fuel line 38A, air line 40A, and steam line 42A respectively.

The system also includes a transfer line 44A into which the combusted fuel gas from the combustion vessel 30A and the stripped particulate solids from the solids stripper 22A are mixed to heat and decoke the particulate solids. The transfer line 44A is sized to afford sufficient residence time for the steam emanating from the combustion vessel 30A to decompose by the reaction with carbon in the presence of hydrogen and to remove the net carbon from the solids-gas mixture. In the preferred embodiment the transfer line 44 will be about 100 feet long. A line 26A is provided for pneumatic transport gas if necessary.

A separator, such as a cyclone separator 46A is provided to separate the heated decoked particulate solids from the fuel gas. The particulate solids from the separator 46A are returned through line 48A to the hot solids hold vessel 27A and the fuel gas is taken overhead through line 50A.

In the process, fuel, air and steam are delivered through lines 38A, 40A and 42A respectively to the combustion vessel 30A and combusted therein to a temperature of about 2,300° F. to produce a fuel gas having a high ratio of CO to $CO_2$ and at least an equivalent molal ratio of $H_2O$ to $H_2$. The $H_2O$ to $H_2$ ratio of the fuel gas leaving the combustion vessel 30A is above the ratio required to decompose steam by reaction with carbon in the presence of hydrogen and to insure that the net carbon in the fuel gas-particulate solids mix will be removed before reaching the separator 46A.

The fuel gas from combustion vessel 30A at a temperature of about 2,300° F. is mixed in the tubular vessel 44A with stripped particulate solids having a temperature of about 1,450° F. The particulate solids and fuel gas rapidly reach an equilibrium temperature of 1,780° F. and continue to pass through the tubular vessel 44A. During the passage through the tubular vessel 44A the particulate solid-fuel gas mixture provide the heat necessary to react the net coke in the mixture with steam. As a result, the particulate solid-fuel gas mixture is cooled by about 30° F. i.e., from 1,780° F. to 1,750° F.

The particulate solid-fuel gas mixture is separated in the separator 46A and the fuel gas is taken at 1,750° F. through line 50A. The particulate solids are delivered to the hot solids hold vessel 27A at 1,750° F. and then to the tubular reactor 13A.

In the alternative embodiment of the invention illustrated in FIG. 3, only fuel and air are delivered to the combustor 30 and burned to a temperature of about 2,300° F. to provide a fuel gas. The fuel gas at 2,300° F. and particulate solids at about 1,450° F. are mixed in the transfer line 44A to a temperature of about 1,486° F. Thereafter air is delivered to the transfer line 44A through a line 54A. The fuel gas in the line 44A is burned to elevate the temperature of the particulate solids to about 1,750° F. The resultant flue gas is separated from the hot solids in the separator 46A and discharged through the line 52A. The hot particulate solids are returned to the system to provide reaction heat.

An example of the system and process of FIG. 3 follows: 7,000 pounds per hour of fuel pre-heated to 600° F. in the preheater 32A and 13 MM SCFD of air heated to 1,000° F. are burned in the combustor 30A to 2,300° F. to produce 15.6 MM SCFD of fuel gas.

The 15 MM SCFD of fuel gas at 2,300° F. is mixed in the transfer line 44A with 1 MM pounds per hour of stripped particulate solids from the solids stripper 22A. The particulate solids have 1,600 pounds per hour of carbon deposited thereon. The composite fuel gas-particulate solids gas mixture reaches an equilibrium temperature of 1,480° F. at 5 psig in about 5 milliseconds. Thereafter, 13 MM SCFD of air is delivered to the transfer line 44A and the 15.6 MM SCFD of fuel gas is burned with the air to elevate the solids temperature to 1,750° F. and burn the 1,600 pounds per hour of carbon from the particulate solids.

The combusted gas from the transfer line 44A is separated from the solids in the separator 46A and discharged as flue gas.

(b) Improved Solids Feeding Device and System

Again referring to FIG. 4, in lieu of the system of the prior art (see FIG. 1) wherein the stream of solids plus fluidizing gas contact the flash liquid-dilution steam mixture entering reactor 28, it is seen that structurally the apparatus 32B of the subject invention comprises a solids reservoir vessel 33B and a housing 34B for the internal elements described below. The housing 34B is conically shaped in the embodiment of FIG. 4 and serves as a transition spool piece between the reservoir 33B and the reactor 32B to which it is flangeably connected via flanges 35B, 36B, 37B and 38B. The particular geometry of the housing is functional rather than critical. The housing is itself comprised of an outer metallic shell 39B, preferably of steel, and an inner core 40B of a castable ceramic material. It is convenient that the material of the core 40B forms the base 41B of the reservoir 33B.

Set into and supported by the inner core 40B is a gas distribution chamber 42B, said chamber being supplied with gaseous feed from a header 43B. Although the chamber 42B may be of unitary construction, it is preferred that the base separating the chamber 42B from reaction zone 44B be a removable plate 45B. One or more conduits 46B extend downwardly from the reservoir 33B to the reaction zone 44B, passing through the base 41B, and the chamber 42B. The conduits 46B are in open communication with both the reservoir 33B and the reaction zone 44B providing thereby a path for the flow of solids from the reservoir 33B to the reaction zone 44B. The conduits 46B are supported by the material of the core 40B, and terminate coplanarly with a plate 45B, which has apertures 47B to receive the conduits 46B. The region immediately below the plate 45B is hereinafter referred to as a mixing zone 53B which is also part of the reaction zone 44.

As shown in FIG. 5, an enlarged partial view of the intersection of the conduit 46B and the plate 45B, the apertures 47B are larger than the outside dimension of conduits 46B, forming therebetween annular orifices 48B for the passage of gaseous feed from the chamber 42B. Edges 49B of the apertures 47B are preferably convergently beveled, as are the edges 50B, at the tip of the conduit wall 51B. In this way the gaseous stream from the chamber 42B is angularly injected into the mixing zone 53B and intercepts the solids phase flowing from conduits 46B. A projection of the gas flow would form a cone shown by dotted lines 52B the vertex of which is beneath the flow path of the solids. By introducing the gas phase angularly, the two phases are mixed rapidly and uniformly, and form a homogeneous reaction phase. The mixing of a solid phase with a gaseous phase is a function of the shear surface between the solids and gas phases, and the flow area. A ratio of shear surface to flow area (S/A) of infinity defines perfect mixing; poorest mixing occurs when the solids are introduced at the wall of the reaction zone. In the system of the present invention, the gas stream is introduced annularly to the solids which ensures high shear surface. By also adding the gas phase transversely through an annular feed means, as in the preferred embodiment, penetration of the phases is obtained and even faster mixing results. By using a plurality of annular gas feed points and a plurality of solid feed conduits, even greater mixing is more rapidly promoted, since the surface to area ratio for a constant solids flow area is increased. Mixing is also a known function of the L/D of the mixing zone. A plug creates an effectively reduced diameter D in a constant L, thus increasing mixing.

Figure 4:
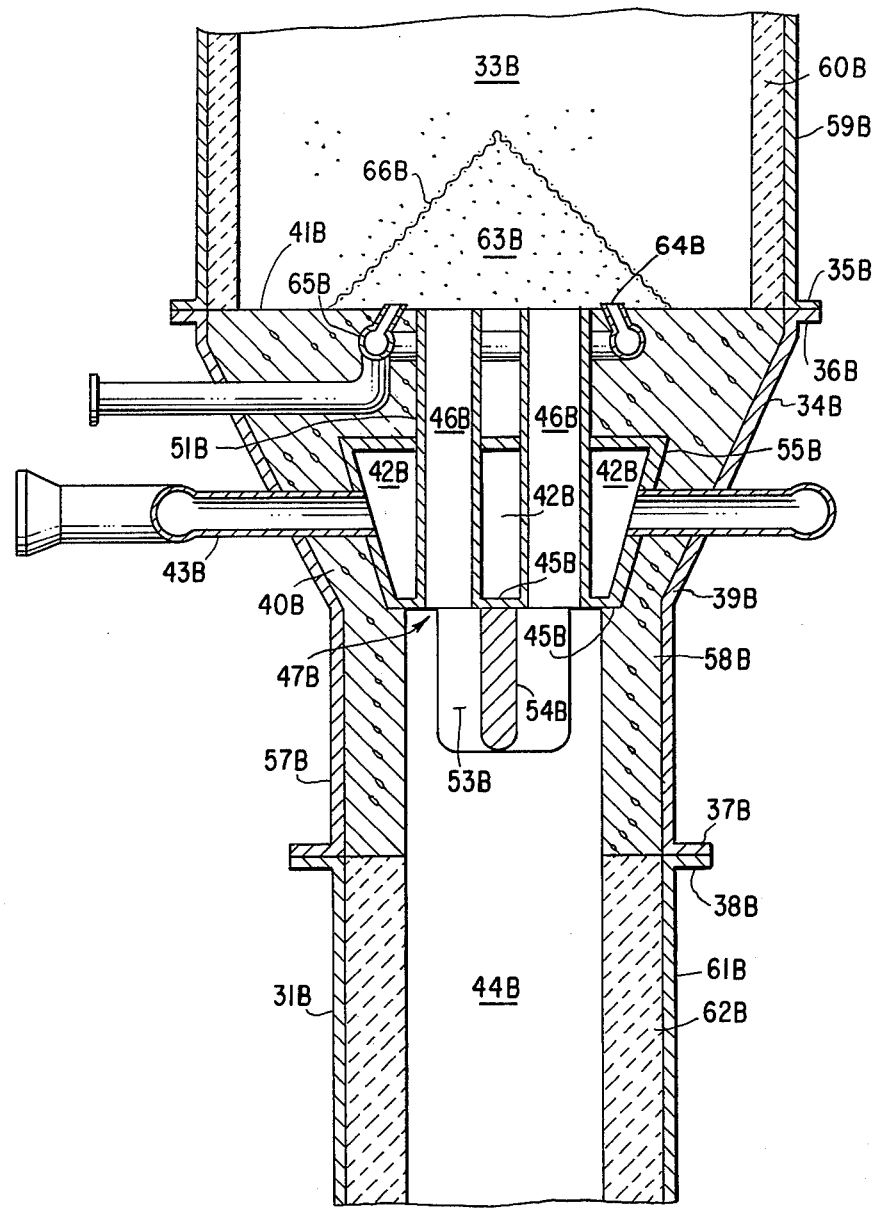
FIG. 4 is a cross-sectional elevational view of the solids feeding device and system as applied to tubular reactors and for use with gaseous feeds.

The plug 54B, which extends downwardly from plate 45B, as shown in FIGS. 4 and 5, reduces the flow area, and forms discrete mixing zones 53B. The combination of annular gas addition around each solids feed point and a confined discrete mixing zone greatly enhances the conditions for mixing. Using this preferred embodiment, the time required to obtain an essentially homogeneous reaction phase in the reaction zone 44B is quite low. Thus, this preferred method of gas and solids addition can be used in reaction systems having a residence time below 1 second, and even below 100 milliseconds. In such reactions the mixing step must be performed in a fraction of the total residence time, generally under 20% thereof. If this criterion is not achieved, localized and uncontrolled reaction occurs which deleteriously affects the product yield and distribution. This is caused by the maldistribution of solids normal to the flow through the reaction zone 44B thereby creating temperature and or concentration gradients therein.

The flow area is further reduced by placing the apertures 47B as close to the walls of the mixing zone 53B as possible. FIG. 6 shows the top view of plate 45B having incomplete circular apertures 47B symmetrically spaced along the circumference. The plug 54B, shown by the dotted lines in FIG. 6 and in perspective in FIG. 9, is below the plate, and establishes the discrete mixing zones 53B described above. In this embodiment, the apertures 47B are completed by the side walls 55B of gas distribution chamber 42B as shown in FIG. 5. In order to prevent movement of conduits 46B by vibration and to retain the uniform width of the annular orifices 48B, spacers 56B, are used as shown in FIG. 8. However, the conduits 46B are primarily supported within the housing 34B by the material of the core 40B as stated above.

Referring to FIG. 9, the plug 54B serves to reduce the flow area and define discrete mixing zones 53B. The plug 54B may also be convergently tapered so that there is a gradual increase in the flow area of the mixing zone 53B until the mixing zone merges with the remainder of the reaction zone 44B. Alternatively, a plurality of plugs 54B can be used to obtain a mixing zone 53B of the desired geometric configuration.

Referring again to FIG. 4, the housing 34B may preferably contain a neck portion 57B with corresponding lining 58B of the castable ceramic material and a flange 37B to cooperate with a flange 38B on the reaction chamber 31B to mount the neck portion 57B. This neck portion 57B defines mixing zone 53B, and allows complete removal of the housing 34B without disassembly of the reactor 31B or the solids reservoir 33B. Thus, installation, removal and maintenance can be accomplished easily. Ceramic linings 60B and 62B on the reservoir 33B and the reactor walls 61B respectively are provided to prevent erosion.

The solids in reservoir 33B are not fluidized except solids 63B in the vicinity of conduits 46B. Aeration gas to locally fluidize the solids 63B is supplied by nozzles 64B symmetrically placed around the conduits 46B. Gas to nozzles 64B is supplied by a header 65B. Preferably, the header 65B is set within the castable material of the core 40B, but this is dependent on whether there is sufficient space in the housing 34B. A large mesh screen 66B is placed over the inlets of the conduit 64B to prevent debris and large particles from entering the reaction zone 44B or blocking the passage of the particulate solids through the conduits 46B.

By locally fluidizing the solids 63B, the solids 63B assume the characteristics of a fluid, and will flow through the conduits 46B. The conduits 46B have a fixed cross sectional area, and serve as orifices having a specific response to a change in orifice pressure drop. Generally, the flow of fluidized solids through an orifice is a function of the pressure drop through the orifice. That orifice pressure drop, in turn, is a function of bed height, bed density, and system pressure.

However, in the process and apparatus of this invention the bulk of the solids in reservoir 33B are not fluidized. Thus, static pressure changes caused by variations in bed height are only slowly communicated to the inlet of the conduit 46B. Also the bed density remains approximately constant until the point of incipient fluidization is reached, that is, point "a" of FIG. 7. In the present invention, however, it is essential that the amount of aeration gas be below that amount. Any aeration gas flow above that at point "a" on FIG. 7 will effectively provide a fluidized bed and thereby lose the benefits of this invention. By adjustment of the aeration gas flow rate, the pressure drop across the non-fluidized bed can be varied. Accordingly, the pressure drop across the orifice is regulated and the flow of solids thereby regulated as shown in FIG. 7. With gas flow rates below incipient fluidization, significant pressure increases above the orifice can be obtained without fluidizing the bulk of the solids. Any effect which the bed height and the bed density variations have on mass flow are dampened considerably by the presence of the non-fluidized reservoir solids and are essentially eliminated as a significant factor. Further the control provided by this invention affords rapid response to changes in solids mass flow regardless of the cause.

Together with the rapid mixing features described above, the present invention offers an integrated system for feeding particulate solids to a reactor or vessel, especially to a TRC tubular reactor wherein very low reaction residence times are encountered.

Figure 10:
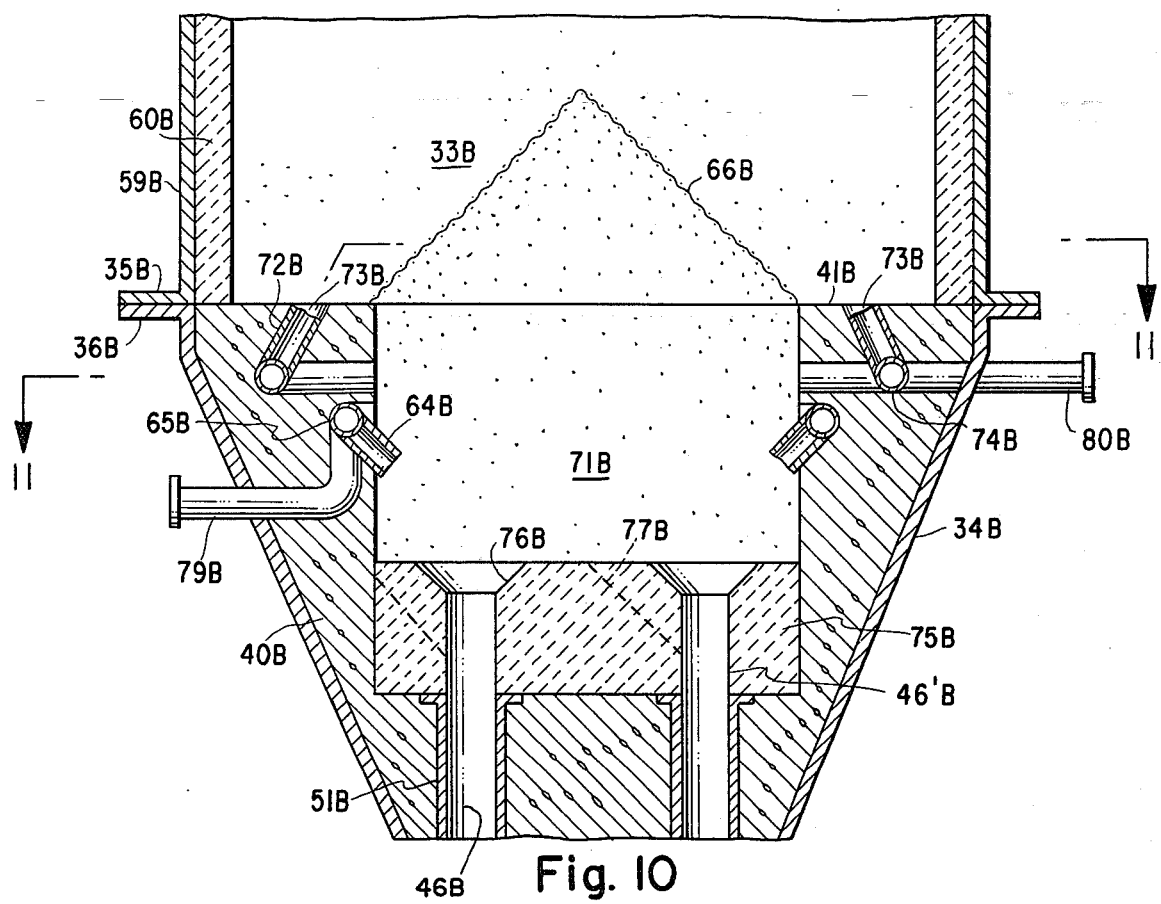
FIG. 10 is an alternate preferred embodiment of the control features of the present invention.
Figure 11:
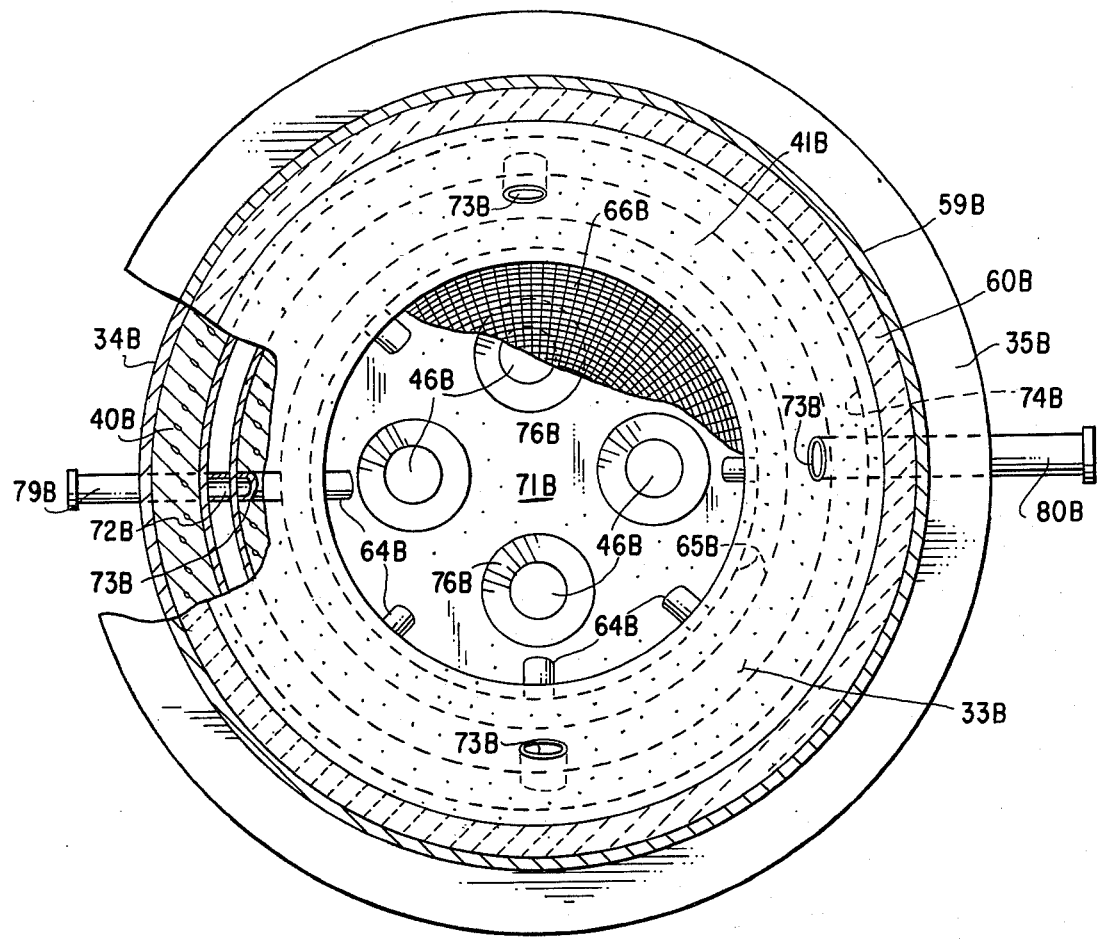
FIG. 11 is a view along line 11—11 of FIG. 10 showing the header and piping arrangements supplying aeration gas to the clean out and fluidization nozzles.

FIGS. 10 and 11 depict an alternate preferred embodiment of the control features of the present invention. In this embodiment the reservoir 33B extends downwardly into the core material 40B to form a secondary or control reservoir 71B. The screen 66B is positioned over the entire control reservoir 71B. The aeration nozzles 64B project downwardly to fluidize essentially the solids in the area beneath the screen 66B. The bottom 41B of the reservoir 33B is again preferably formed of the same material as the core 40B.

A plurality of clean out nozzles 72B are preferably provided to allow for an intermittent aeration gas discharge which removes debris and large particles that may have accumulated on the screen 66B. Porous stone filters 73B prevent solids from entering the nozzles 72B. Headers 65B and 74B provide the gas supply to nozzles 64B and 72B respectively.

The conduits 46B communicate with the reservoir 71B through leading section 46′B. The leading sections 46′B are formed in a block 75B made of castable erosion resistent ceramic material such as Carborundum Alfrax 201. The block 75B is removable, and can be replaced if eroded. The entrance 76B to each section 46′B can be sloped to allow solids to enter more easily. In addition to being erosion resistent, the block 75B provides greater longevity because erosion may occur without loss of the preset response function. Thus, even if the conduit leading sections 46′B erode as depicted by dotted lines 77B, the remaining leading section 46′B will still provide a known orifice size and pressure drop response. The conduits 46B are completed as before using erosion resistent metal tubes 51B, said tubes being set into core material 40B and affixed to the block 75B.

FIG. 11 is a plan view of FIG. 10 along section 11—11 showing an arrangement for the nozzles 64B and 72B, and the headers 65B and 74B. Gas is supplied to the headers 65B and 74B through feed lines 79B and 80B respectively, which extend out beyond the shell 34B. It is not necessary that the headers be set into the material of the core 40B, although this is a convenience from the fabrication standpoint. Uniform flow distribution to each of the nozzles is ensured by the hydraulics of the nozzles themselves, and does not require other devices such as an orifice or venturi. The gas supplied to feed lines 79B and 80B is regulated via valve means not shown.

Figure 12:
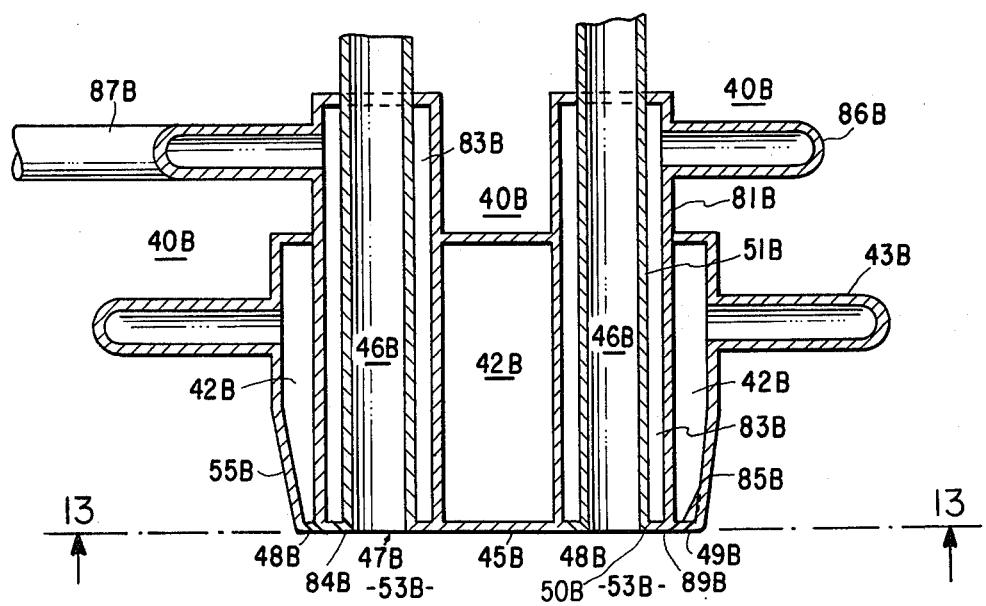
FIG. 12 is an alternate embodiment of the preferred invention wherein a second feed gas is contemplated.
Figure 13:
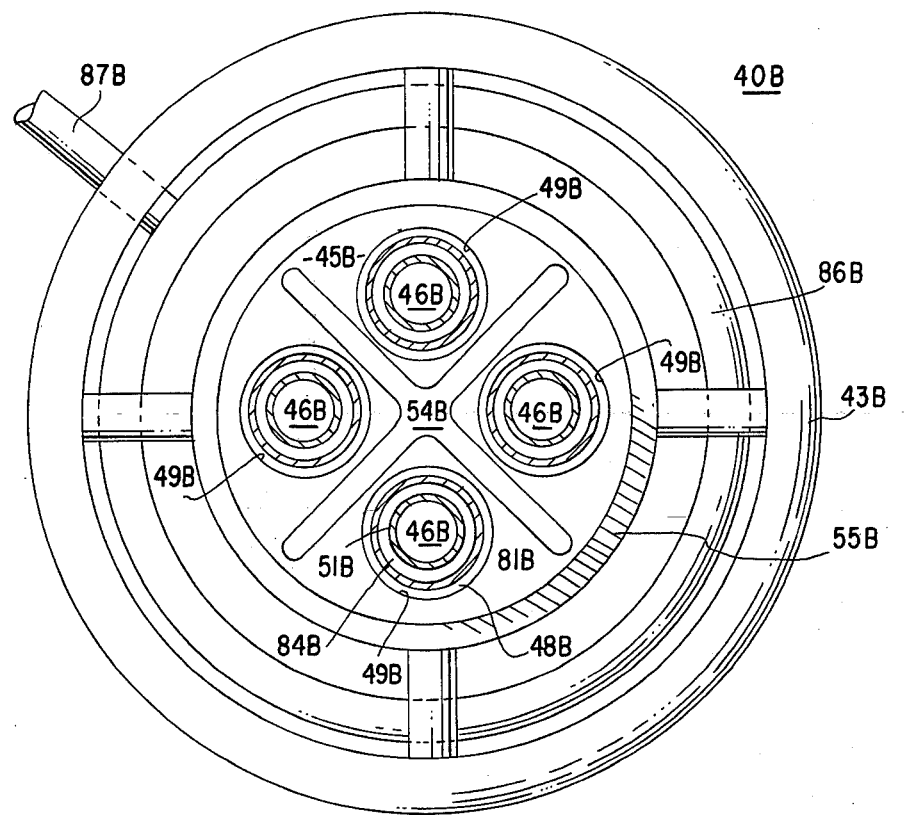
FIG. 13 is a view of the apparatus of FIG. 12 through line 13—13 of FIG. 12.

FIGS. 12 and 13 show the pertinent parts of an alternate embodiment of the invention wherein a second gas distribution assembly for feed gas is contemplated. As in the other embodiments, a gas distribution chamber 42B terminating in annular orifice 48B surrounds each solids delivery conduit 46B. However, rather than a common wall between the chamber 42B and the conduit 46B, a second annulus 83B is formed between the chamber 42B and the conduit 46B. Walls 81B and 51B define the chambers 83B. Feed is introduced through both the annular opening 48B in the chamber 42B and the annular opening 84B in the annulus 83B at an angle to the flow of solids from the conduits 46B. The angular entry of the feed gas to the mixing zone 53B is provided by beveled walls 49B and 85B, which define the openings 48B and beveled walls 50B and 89B which define the openings 84B. Gas is introduced to the annulus 83B through the header 86B, the header being set into the core 40B if convenient.

FIG. 13 is a plan view of the apparatus of FIG. 12 through section 11—11 showing the conduit openings and the annular feed openings 48B and 84B. Gas is supplied through feed line 87B to the header 86B and ultimately to the mixing zones through the annular openings. Uniform flow from the chambers 42B and 83B is ensured by the annular orifices 48B and 84B. Therefore, it is not essential that flow distribution means such as venturis or orifices be included in the header 43B. The plug 54B is shaped symmetrically to define discrete mixing zones 53B.

Mixing efficiency is also dependent upon the velocities of the gas and solids phases. The solids flow through the conduits 46B in dense phase flow at mass velocities from preferably 200 to 500 pounds/sq. ft./sec, although mass velocities between 50 and 1000 pounds/sq. ft./sec., may be used depending on the characteristics of the solids used. The flow pattern of the solids in the absence of gas is a slowly diverging cone. With the introduction of the gas phase through the annular orifices 48B at velocities between 30 and 800 ft./sec., the solids develop a hyperbolic flow pattern which has a high degree of shear surface. Preferably, the gas velocity through the orifices 48B is between 125 and 250 ft./sec. Higher velocities are not preferred because erosion is accelerated; lower velocities are not preferred because the hyperbolic shear surface is less developed.

The initial superficial velocity of the two phases in the mixing zone 53B is preferably about 20 to 80 ft./sec., although this velocity changes rapidly in many reaction systems, such as thermal cracking, as the gaseous reaction products are formed. The actual average velocity through the mixing zone 53B and the reaction zone 44B is a process consideration, the velocity being a function of the allowed residence time therethrough.

By employing the solids feed device and the method of the present inventions, the mixing length to diameter ratio necessary to intimately mix the two phases is greatly reduced. This ratio is used as an informal criterion which defines good mixing. Generally, an L/D (length/dia.) ratio of from 10 to 40 is required. Using the device disclosed herein, this ratio is less than 5, with ratios less than 1.0 being possible. Well designed mixing devices of the present invention may even achieve essentially complete mixing at L/D ratios less than 0.5.

(c) Improved Sequential Thermal Cracking Process

Figure 14:
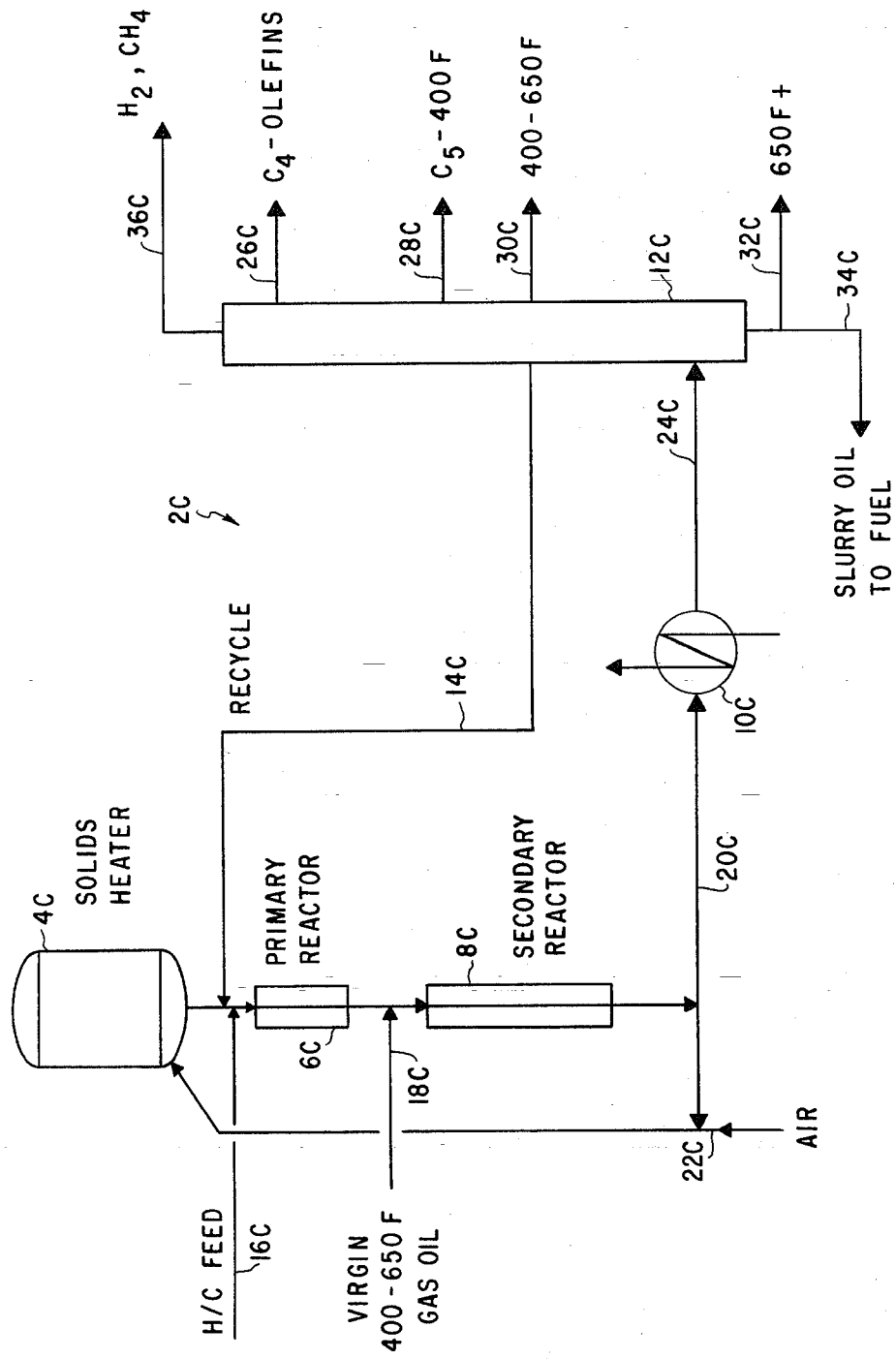
FIG. 14 is a schematic diagram of the sequential thermal cracking process and system of the present invention.

Turning now to the sequential cracking process 2C of the subject invention, as illustrated in FIG. 14, in lieu of the reactor 28 (see FIG. 1) of the prior art, the system of the invention includes a solids heater 4C, a primary reactor 6C, a secondary reactor 8C and downstream equipment. The downstream equipment is comprised essentially of an indirect heat exchanger 10C, a fractionation tower 12C, and a recycle line 14C from the fractionation tower 12C to the entry of the primary reactor 6C.

The system also includes a first hydrocarbon feed line 16C, a second hydrocarbon feed-quench line 18C, a transfer line 20C and an air delivery line 22C.

The first hydrocarbon feed stream is introduced into the primary reactor 6C and contacted with heated solids from the solids heater 4C. The first or primary reactor 6C in which the first feed is cracked is at high severity conditions. The hydrocarbon feed, from line 16C, may be any hydrocarbon gas or hydrocarbon liquid in the vaporized state which has been used heretofore as a feed to the conventional thermal cracking process. Thus, the feed introduced into the primary reactor 6C may be selected from the group consisting of low molecular weight hydrocarbon gases such as ethane, propane, and butane, light hydrocarbon liquids such as pentane, hexane, heptane and octane, low boiling point gas oils such as naphtha having a boiling range between 350° to 650° F., high boiling point gas oils having a boiling range between 650° to 950° F. and compatible combinations of the same. These constituents may be introduced as fresh feed or as recycle streams through the line 14C from downstream purification facilities e.g., fractionation tower 12C. Dilution steam may also be delivered with the hydrocarbon through lines 16C and 14C. The use of dilution steam reduces the partial pressure, improves cracking selectivity and also lessens the tendency of high boiling aromatic components to form coke.

The preferred primary feedstock for the high severity reaction is a light hydrocarbon material selected from the group consisting of low molecular weight, hydrocarbon gases, light hydrocarbon liquids, light gas oils boiling between 350° and 650° F., and combinations of the same. These feedstocks offer the greatest increased improvement in selectivity at high severity and short residence times.

The hydrocarbon feed to the first reaction zone is preferably pre-heated to a temperature of between 600° to 1200° F. before introduction thereto. The inlet pressure in the line 16C is 10 to 100 psig. The feed should be a gas or gasified liquid. The feed increases rapidly in temperature reaching thermal equilibrium with the solids in about 5 milliseconds. As mixing of the hydrocarbon with the heated solids occurs, the final temperature in the primary reactor reaches about 1600° to 2000° F. At these temperatures a high severity thermal cracking reaction takes place. The residence time maintained within the primary reactor is about 50 milliseconds, preferably between 20 and 150 milliseconds, to ensure a high conversion at high selectivity. Typically, the KSF (Kinetic Severity Function) is about 3.5 (97% conversion of n-pentane). Reaction products of this reaction are olefins, primarily ethylene with lesser amounts of propylene and butadiene, hydrogen, methane, $C_4$ hydrocarbons, distillates such as gasoline and gas oils, heavy fuel oils, coke and an acid gas. Other products may be present in lesser quantities. Feed conversion in this first reaction zone is about between 95 to 100% by weight of feed, and the yield of ethylene for liquid feedstocks is about 25 to 45% by weight of the feed, with selectivities of about 2.5 to 4 pound of ethylene per pound of methane.

A second feed is introduced through the line 18C and combines with the cracked gas from the primary reactor 6C between the primary reactor 6C and the secondary reactor 8C. The combined stream comprising the second unreacted feed, and the first reacted feed passes through the secondary reactor 8C under low severity reaction conditions. The second feed introduced through the line 18C is preferably virgin feed stock but may also be comprised of the hydrocarbons previously mentioned, including recycle streams containing low molecular weight hydrocarbon gases, light hydrocarbon liquids, low boiling point hydrocarbons, light compatible gas oils, high boiling point gas oils, and combinations of the same.

Supplemental dilution steam may be added with the secondary hydrocarbon stream entering through line 18C. However, in most instances the amount of steam initially delivered to the primary reactor 6C will be sufficient to achieve the requisite partial pressure reduction in the reactors 6C and 8C. It should be understood that the recycle stream from line 14C is illustrative, and not specific to a particular recycle constituent.

The hydrocarbon feed delivered through the line 18C is preferably virgin gas oil 400°–650° F. The second feed is preheated to between 600° to 1200° F. and upon entry into the secondary reactor 8C quenches the reaction products from the primary reactor to below 1500° F. It has been found that in general 100 pounds of hydrocarbon delivered through the line 18C will quench 60 pounds of effluent from the primary reactor 6C. At this temperature level, the cracking reactions of the first feed are essentially terminated. However, coincident with the quenching of the effluent from the primary reactor, the secondary feed entering through line 18C is thermally cracked at this temperature (1500° to 1200° F.) and pressures of 10 to 100 psig at low severity by providing a residence time in the secondary reactor between 150 and 2000 milliseconds, preferably between 250 to 500 milliseconds. Typically, the KSF cracking severity in the secondary reactor is about 0.5 at 300 to 400 milliseconds.

The inlet pressure of the second feed in line 18C is between 10 and 100 psig, as is the pressure of the first feed. Reaction products from the low severity reaction zone comprise ethylene with lesser amounts of propylene, butadiene, hydrogen, methane, $C_4$ hydrocarbons, petroleum distillates, gas oils, heavy fuel oils, coke and an acid gas. Minor amounts of other products may also be produced. Feed conversion in this second reaction zone is about 30 to 80% by weight of feed, and the yield of ethylene is about 8 to 20% by weight of feed, with selectivities of 2.5 to 4.0 pounds of ethylene per pound of methane.

Although the products from the high severity reaction are combined with the second feed, and pass through the second reaction zone, the low severity conditions in the second reaction zone are insufficient to appreciably alter the product distribution of the primary products from the high severity reaction zone. Some chemical changes will occur, however these reaction products are substantially stabilized by the direct quench provided by the second feed.

The virgin gas oils normally contain aromatic molecules with paraffinic hydrocarbon side chains. For some gas oils the number of carbon atoms associated with such paraffinic side chains will be a large fraction of the total number of carbon atoms in the molecule, or the gas oil will have a low "aromaticity".

In the secondary reactor, these molecules will undergo dealkylation-splitting of the paraffin molecules, leaving a reactive residual methyl aromatic, which will tend to react to form high boilers. The paraffins in the boiling range 400° to 650° F. are separated from the higher boiling aromatics in column 12C and constitute the preferred recycle to the primary reactor 6C.

Other recycle feed stocks can include propylene, butadiene, butenes and the $C_5$–400° F. pyrolysis gasoline.

The total effluent leaves the secondary reactor and is passed through the indirect quench means 10C to generate steam for use within and outside the system. The effluent is then sent to downstream separation facilities 12C via line 24C.

The purification facilities 12C employ conventional separation methods used currently in thermal cracking processes. FIG. 14 illustrates schematically the products obtained. Hydrogen and methane are taken overhead through the line 36C. $C_4$ and lighter olefins, $C_5$–400° F. and 400°–650° F. fractions are removed from the fractionator 12C through lines 26C, 28C and 30C respectively. Other light paraffinic gases of ethane and propane are recycled through the line 14C to the high severity primary reactor 6C. The product taken through line 28C consists of liquid hydrocarbons boiling between $C_5$ and 400° F., and is preferably exported although such material may be recycled to the primary reactor 6C if desired. The light gas oil boiling between 400° to 650° F. is the preferred recycle feed, but may be removed through line 30C. The heavy gas oil which boils between 650°–950° F. is exported through stream 32C, while excess residuim, boiling above 950° F. is removed as bottoms via stream 34C. The heavy gas oil and residuim may also be used as fuel within the system.

In the preferred embodiment of the process, the second feed would be one which is not recommended for high severity operation. Such a feed would be a gas oil boiling above 400° F. which contains a significant amount of high molecular weight aromatic components. Generally, these components have paraffinic side chains which will form olefins under proper conditions. However, even at moderate severity, the dealkylated aromatic rings will polymerize to form coke deposits. By processing the aromatic gas oil feed at low severity, it is possible to dealkylate the rings, but also to prevent subsequent polymerization and coke formation. As a consequence of the low severity, however, the yield of olefins is low, even though selectivity is previously defined is high. Hence, low severity reaction effluents often have significant amounts of light paraffinic gases and paraffinic gas oils. These light gases and paraffinic gas oils are recycled preferably to the high severity section, such compounds being the preferred feeds thereto. The aromatic components of the effluent are removed from the purification facilities 12C as part of the heavy gas oil product, and either recycled for use as fuel within the system, or exported for further purification or storage.

An illustration of the benefits of the process of the invention is set forth below wherein feed cracked and the resultant product obtained under conventional high severity cracking and quenching conditions is compared with the same feed sequentially cracked in accordance with this invention.

(d) Improved Residence Time Solid-Gas Separation Device and System

Figure 15:
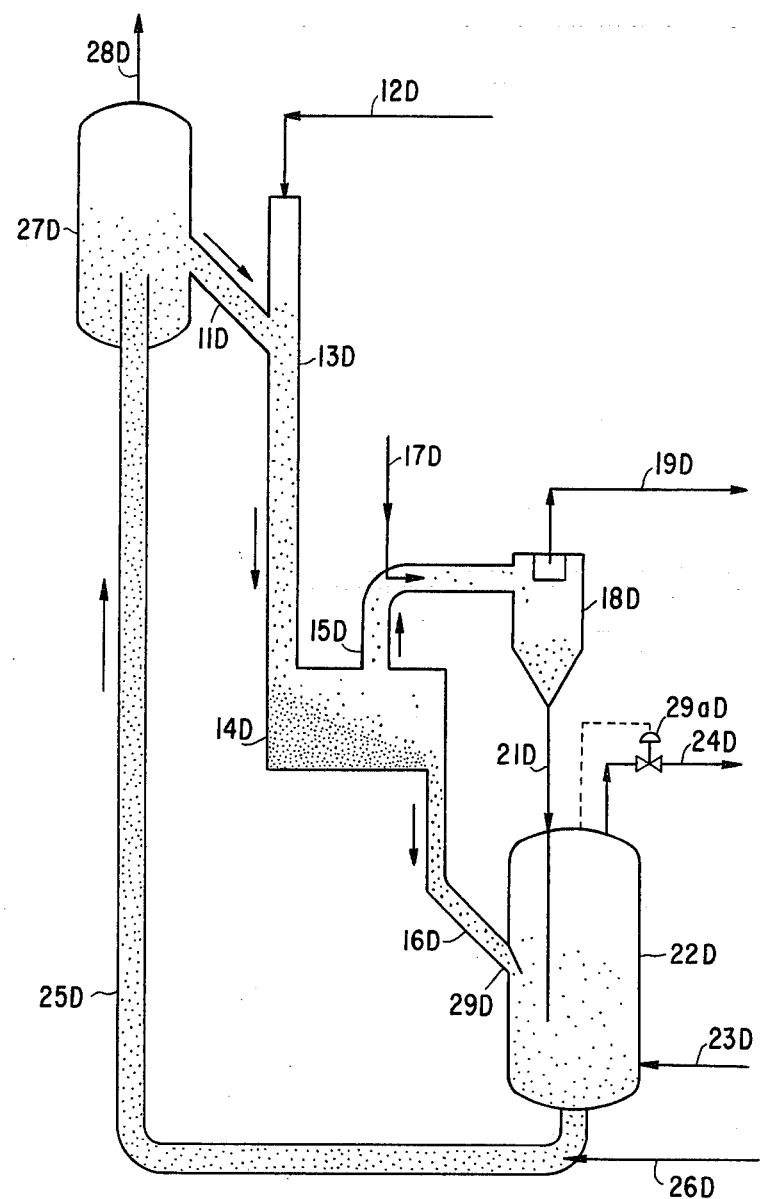
FIG. 15 is a schematic flow diagram of the separation system of the present invention as appended to a typical tubular reactor.

Referring to FIG. 15 in the subject invention, in lieu of a separation zone or curved segment region 36 and the quench area 44 of the prior art TRC system (see FIG. 1), solids and gas enter the tubular reactor 13D through lines 11D and 12D respectively. The reactor effluent flows directly to separator 14D where a separation into a gas phase and a solids phase stream is effected. The gas phase is removed via line 15D, while the solids phase is sent to the stripping vessel 22D via line 16D. Depending upon the nature of the process and the degree of separation, an in-line quench of the gas leaving the separator via line 15D may be made by injecting quench material from line 17D. Usually, the product gas contains residual solids and is sent to a secondary separator 18D, preferably a conventional cyclone separator. Quench material should be introduced into line 15D in a way that precludes back flow of quench material to the separator. The residual solids are removed from separator 18D via line 21D, while essentially solids free product gas is removed overhead through line 19D. Solids from lines 16D and 21D are stripped of gas impurities in fluidized bed stripping vessel 22D using steam or other inert fluidizing gas admitted via line 23D. Vapors are removed from the stripping vessel through line 24D and, if economical or if need be, sent to downstream purification units. Stripped solids removed from the vessel 22D through line 25D are sent to regeneration vessel 27D using pneumatic transport gas from line 26D. Off gases are removed from the regenerator through line 28D. After regeneration the solids are then recycled to reactor 13D via line 11D.

The separator 14D should disengage solids rapidly from the reactor effluent in order to prevent product degradation and ensure optimal yield and selectivity of the desired products. Further, the separator 14D operates in a manner that eliminates or at least significantly reduces the amount of gas entering the stripping vessel 22D inasmuch as this portion of the gas product would be severely degraded by remaining in intimate contact with the solids phase. This is accomplished with a positive seal which has been provided between the separator 14D and the stripping vessel 22D. Finally, the separator 14D operates so that erosion is minimized despite high temperature and high velocity conditions that are inherent in many of these processes. The separator system of the present invention is designed to meet each one of these criteria as is described below.

Figure 16:
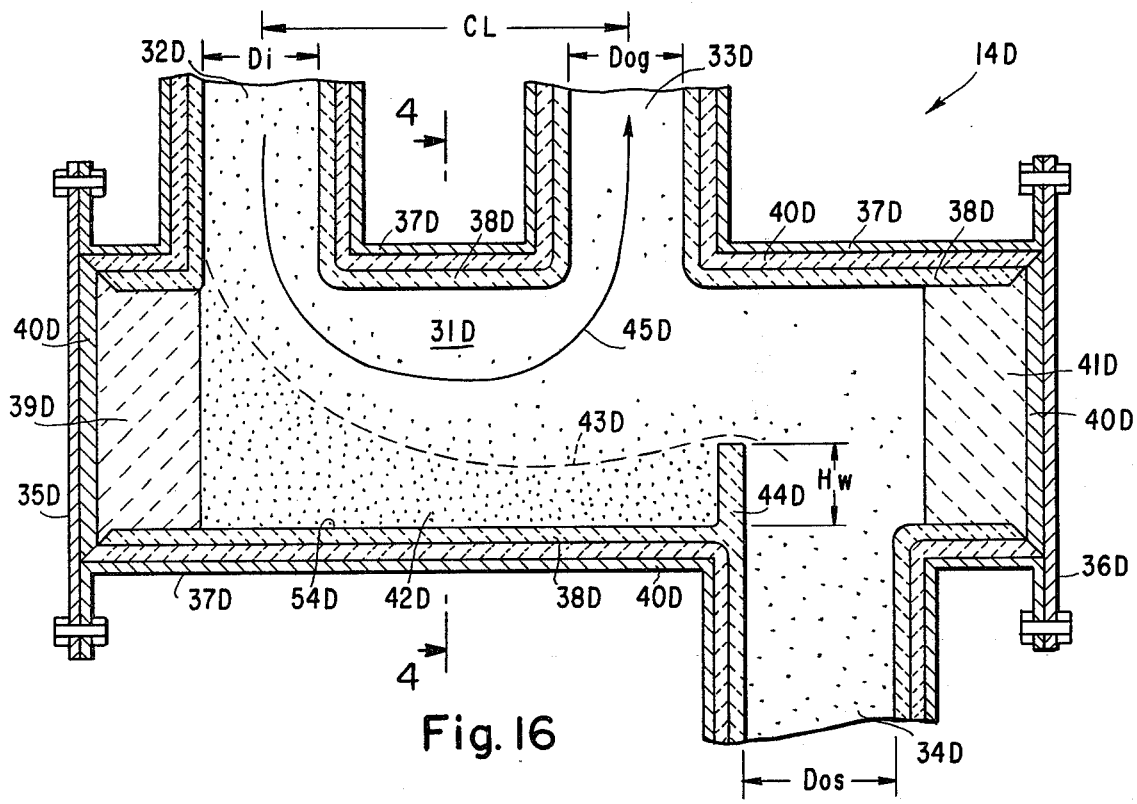
FIG. 16 is a cross sectional elevational view of the preferred embodiment of the separator.

FIG. 16 is a cross sectional elevational view showing the preferred embodiment of solids-gas separation device 14D of the present invention. The separator 14D is provided with a separator shell 37D and is comprised of a solids-gas disengaging chamber 31D having an inlet 32D for the mixed phase stream, a gas phase outlet 33D, and a solids phase outlet 34D. The inlet 32D and the solids outlet 34D are preferably located at opposite ends of the chamber 31D, with the gas outlet 33D at a point therebetween. Clean-out and maintenance manways 35D and 36D may be provided at either end of the chamber 31D. The separator shell 37D and manways 35D and 36D preferably are lined with erosion resistent linings 38D, 39D and 41D respectively which may be required if solids at high velocities are encountered. Typical commercially available materials for erosion resistent lining include Carborundum Precast Carbofrax D, Carborundum Precast Alfrax 201 or their equivalent. A thermal insulation lining 40D may be placed between shell 37D and lining 38D and between the manways and their respective erosion resistent linings when the separator is to be used in high temperature service. Thus, process temperatures above 1500° F. (870° C.) are not inconsistent with the utilization of this device.

Figure 17:
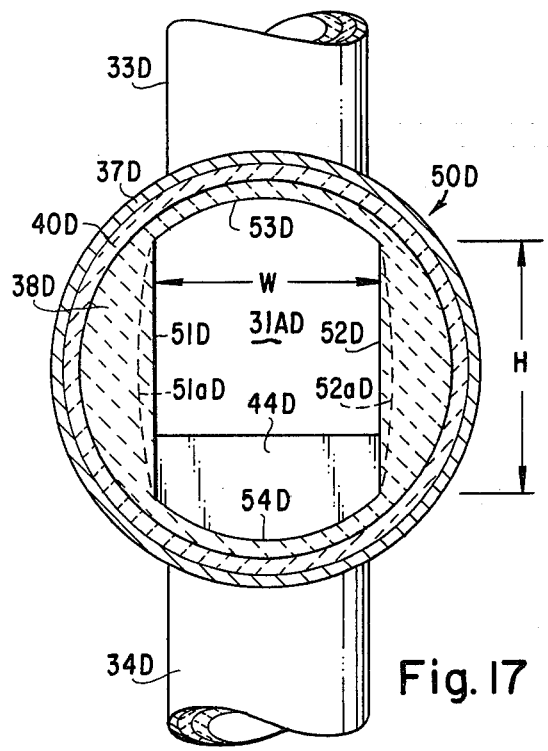
FIG. 17 is a cutaway view through section 17—17 of FIG. 16.
Figure 18:
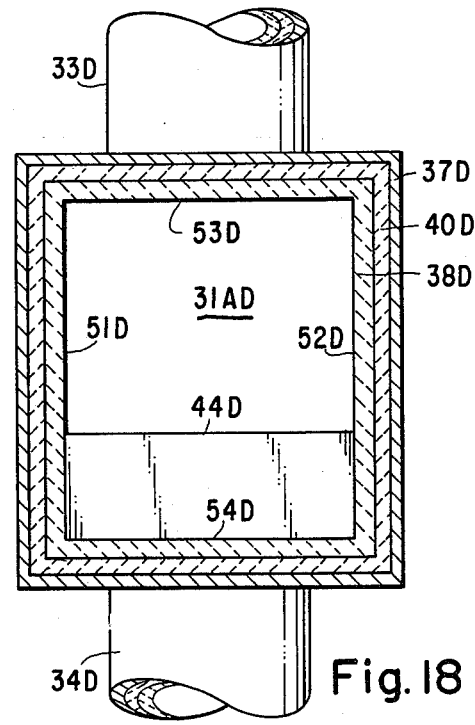
FIG. 18 is a cutaway view through section 18—18 of FIG. 16 showing an alternate geometric configuration of the separator shell.

FIG. 17 shows a cutaway view of the separator along section 4—4 of FIG. 16. For greater strength and ease of construction the shell of the separator 14D is preferably fabricated from cylindrical sections such as pipe 50D, although other materials may, of course, be used. It is essential that longitudinal side walls 51D and 52D should be rectilinear, or slightly arcuate as indicated by the dotted lines 51aD and 52aD. Thus, flow path 31D through the separator is essentially rectangular in cross section having a height H and width W as shown in FIG. 17. The embodiment shown in FIG. 17 defines the geometry of the flow path by adjustment of the lining width for walls 51D and 52D. Alternatively, baffles, inserts, weirs or other means may be used. In like fashion the configuration of walls 53D and 54D transverse to the flow path may be similarly shaped, although this is not essential. FIG. 18 is a cutaway view along Section 4—4 of FIG. 16 wherein the separation shell 37D is fabricated from a rectangular conduit. Because the shell 37D has rectilinear walls 51D and 52D it is not necessary to adjust the width of the flow path with a thickness of lining. Linings 38D and 40D could be added for erosion and thermal resistence respectively.

Again referring to FIG. 16, inlet 32D and outlets 33D are disposed normal to flow path 31D so that the incoming mixed phase stream from inlet 32D is required to undergo a 90° change in direction upon entering the chamber. As a further requirement, however, the gas phase outlet 33D is also oriented so that the gas phase upon leaving the separator has completed a 180° change in direction.

Centrifugal force propels the solid particles to the wall 54D opposite inlet 32D of the chamber 31D, while the gas portion, having less momentum, flows through the vapor space of the chamber 31D. Initially, solids impinge on the wall 54D, but subsequently accumulate to form a static bed of solids 42D, which ultimately form in a surface configuration having a curvilinear arc 43D of approximately 90°. Solids impinging upon the bed are moved along the curvilinear arc 43D to the solids outlet 34D which is preferably oriented for downflow of solids by gravity. The exact shape of the arc 43D is determined by the geometry of the particular separator and the inlet stream parameters such as velocity, mass flowrate, bulk density, and particle size. Because the force imparted to the incoming solids is directed against the static bed 42D rather than the separator 14D itself, erosion is minimal. Separator efficiency, defined as the removal of solids from the gas phase leaving through outlet 33D, is, therefore, not affected adversely by high inlet velocities, up to 150 ft./sec., and the separator 14D is operable over a wide range of dilute phase densities, preferably between 0.1 and 10.0 lbs./ft$^3$. The separator 14D of the present invention achieves efficiencies of about 80%, although the preferred embodiment, discussed below, can obtain over 90% removal of solids.

It has been found that separator efficiency is dependent upon separator geometry inasmuch as the flow path must be essentially rectangular and the relationship between height H, and the sharpness of the U-bend in the gas flow is significant.

Referring to FIGS. 16 and 17 we have found that for a given height H of chamber 31D, efficiency increases as the 180° U-bend between inlet 32D and outlet 33D becomes progressively sharper; that is, as outlet 33D is brought progressively closer to inlet 32D. Thus, for a given H the efficiency of the separator increases as the flow path and, hence, residence time decreases. Assuming an inside diameter $D_i$ of inlet 32D, the preferred distance CL between the centerlines of inlet 32D and outlet 33D is less than 4.0 $D_i$, while the most preferred distance between said centerlines is between 1.5 and 2.5 $D_i$. Below 1.5 $D_i$ better separation is obtained but difficulty in fabrication makes this embodiment less attractive in most instances. Should this latter embodiment be desired, the separator 14D would probably require a unitary casting design because inlet 32D and outlet 33D would be too close to one another to allow welded fabrication.

It has been found that the height of flow path H should be at least equal to the value of $D_i$ or 4 inches in height, whichever is greater. Practice teaches that if H is less than $D_i$ or 4 inches the incoming stream is apt to disturb the bed solids 42D, thereby re-entraining solids in the gas product leaving through outlet 33D. Preferably H is on the order of twice $D_i$ to obtain even greater separation efficiency. Although not otherwise limited, it is apparent that too large an H eventually merely increases residence time without substantive increases in efficiency. The width W of the flow path is preferably between 0.75 and 1.25 times $D_i$, most preferably between 0.9 and $1.10 D_i$.

Outlet 33D may be of any inside diameter. However, velocities greater than 75 ft./sec. can cause erosion because of residual solids entrained in the gas. The inside diameter of outlet 34D should be sized so that a pressure differential between the stripping vessel 22D shown in FIG. 15 and the separator 14D exist such that a static height of solids is formed in solids outlet line 16D. The static height of solids in line 16D forms a positive seal which prevents gases from entering the stripping vessel 22D. The magnitude of the pressure differential between the stripping vessel 22D and the separator 14D is determined by the force required to move the solids in bulk flow to the solids outlet 34D as well as the height of solids in line 16D. As the differential increases the net flow of gas to the stripping vessel 22D decreases. Solids, having gravitational momentum, overcome the differential, while gas preferentially leaves through the gas outlet 33D.

By regulating the pressure in the stripping vessel 22D it is possible to control the amount of gas going to the stripper. The pressure regulating means may include a check or "flapper" valve 29D at the outlet of line 16D, or a pressure control device 29D on vessel 22D. Alternatively, as suggested above, the pressure may be regulated by selecting the size of the outlet 34D and conduit 16D to obtain hydraulic forces acting on the system that set the flow of gas to the stripper 32D. While such gas is degraded, we have found that an increase in separation efficiency occurs with a bleed of gas to the stripper of less than 10%, preferably between 2 and 7%. Economic and process considerations would dictate whether this mode of operation should be used. It is also possible to design the system to obtain a net backflow of gas from the stripping vessel. This gas flow should be less than 10% of the total feed gas rate.

By establishing a minimal flow path, consistent with the above recommendations, residences times as low as 0.1 seconds or less may be obtained, even in separators having inlets over 3 feet in diameter. Scale-up to 6 feet in diameter is possible in many systems where residence times approaching 0.5 seconds are allowable.

In the preferred embodiment of FIG. 16, a weir 44D is placed across the flow path at a point at or just beyond the gas outlet to establish a positive height of solids prior to solids outlet 34D. By installing a weir (or an equivalent restriction) at this point a more stable bed is established thereby reducing turbulence and erosion. Moreover, the weir 44D establishes a bed which has a crescent shaped curvilinear arc 43D of slightly more than 90°. An arc of this shape diverts gas toward the gas outlet and creates the U-shaped gas flow pattern illustrated diagrammatically by line 45D in FIG. 16. Without the weir 44D an arc somewhat less than or equal to 90° would be formed, and which would extend asymptotically toward outlet 34D as shown by dotted line 60D in the schematic diagram of the separator of FIG. 19. Although neither efficiency nor gas loss (to the stripping vessel) is affected adversely, the flow pattern of line 61D increases residence time, and more importantly, creates greater potential for erosion at areas 62D, 63D and 64D.

Figure 19:
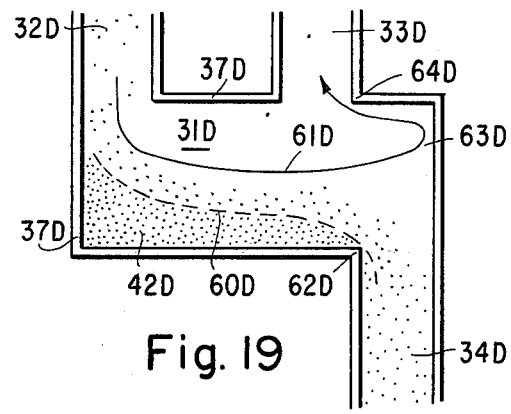
FIG. 19 is a sketch of the separation device of the present invention indicating gas and solids phase flow patterns in a separator without a weir.
Figure 20:
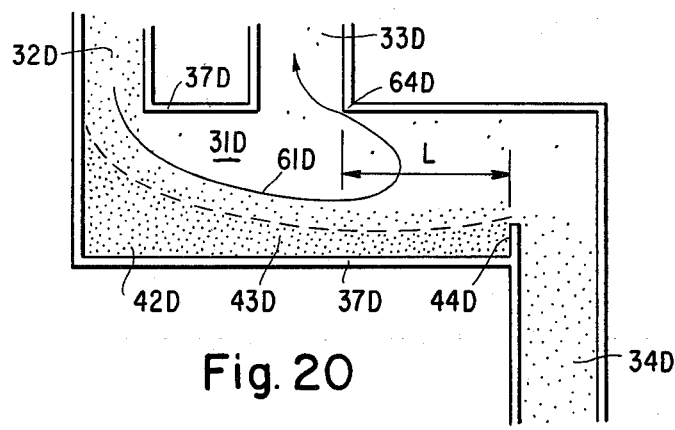
FIG. 20 is a sketch of an alternate embodiment of the separation device having a weir and an extended separation chamber.

The separator of FIG. 20 is a schematic diagram of another embodiment of the separator 14D, said separator 14D having an extended separation chamber in the longitudinal dimension. Here, the horizontal distance L between the gas outlet 33D and the weir 44D is extended to establish a solids bed of greater length. L is preferably less than or equal to 5 $D_i$. Although the gas flow pattern 61D does not develope the preferred U-shape, a crescent, shaped arc is obtained which limits erosion potential to area 64D. Embodiments shown by FIGS. 19 and 20 are useful when the solids loading of the incoming stream is low. The embodiment of FIG. 19 also has the minimum pressure loss and may be used when the velocity of the incoming stream is low.

Figure 21:
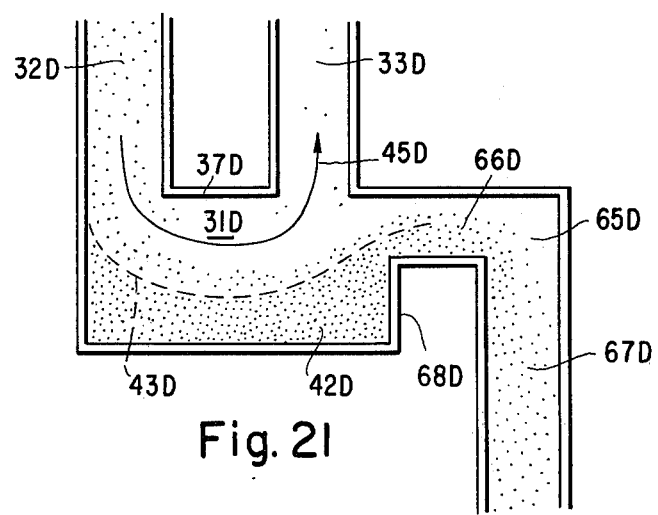
FIG. 21 is a sketch of an alternate embodiment of the separation device wherein a stepped solids outlet is employed, said outlet having a section collinear with the flow path as well as a gravity flow section.

As shown in FIG. 21 it is equally possible to use a stepped solids outlet 65D having a section 66D collinear with the flow path as well as a gravity flow section 67D. Wall 68D replaces weir 44D, and arc 43D and flow pattern 45D are similar to the arc and flow path of the preferred embodiment of FIG. 16. Because solids accumulate in the restricted collinear section 66D, pressure losses are greater. This embodiment, then, is not preferred where the incoming stream is at low velocity and cannot supply sufficient force to expel the solids through outlet 65D. However, because of the restricted solids flow path, better deaeration is obtained and gas losses are minimal.

Figure 22:
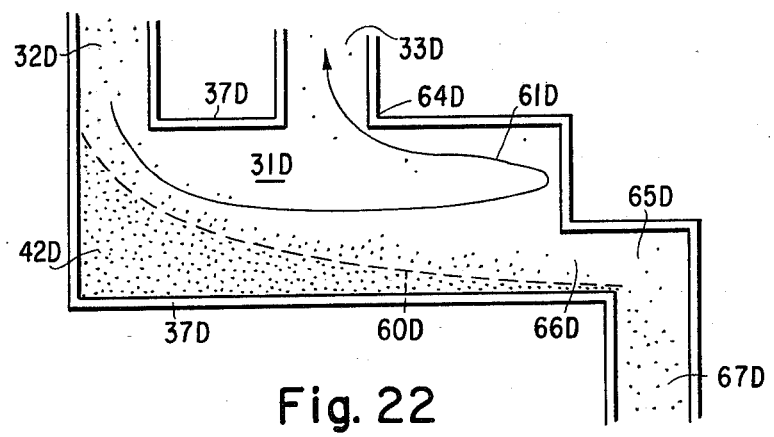
FIG. 22 is a variation of the embodiment of FIG. 21 in which the solids outlet of FIG. 20 is used, but is not stepped.

FIG. 22 illustrates another embodiment of the separator 14D of FIG. 21 wherein the solids outlet is stepped. Although a weir is not used, the outlet restricts solids flow which helps form the bed 42D. As in FIG. 20, an extended L distance between the gas outlet and solids outlet may be used.

Figure 23:
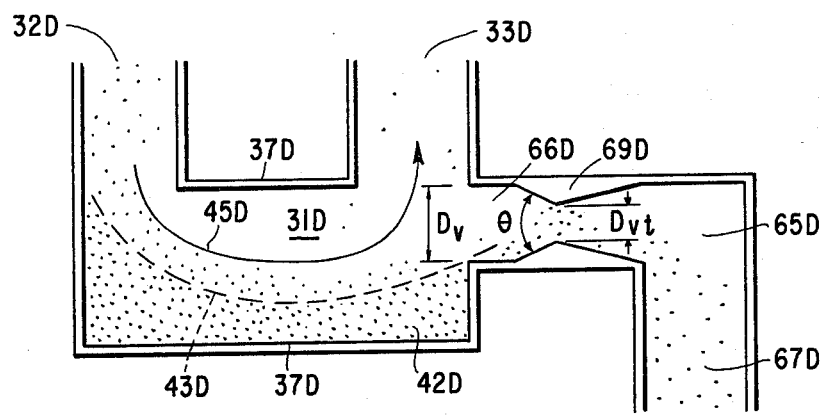
FIG. 23 is a sketch of a variation of the separation device of FIG. 8 wherein a venturi restriction is incorporated in the collinear section of the solids outlet.
Figure 24:
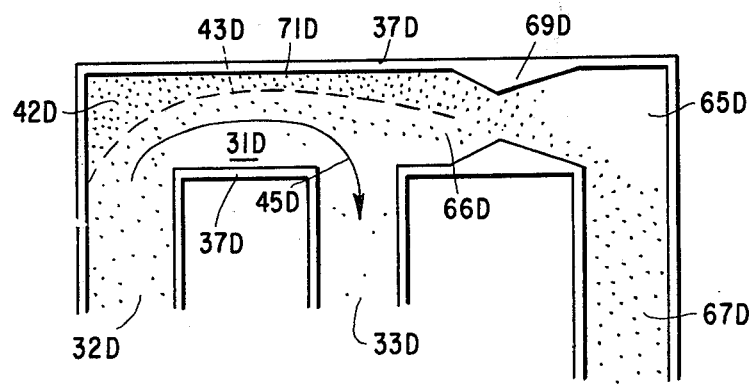
FIG. 24 is a variation of the embodiment of FIG. 23 oriented for use with a riser type reactor.

The separator of FIG. 21 or 22 may be used in conjunction with a venturi, an orifice, or an equivalent flow restriction device as shown in FIG. 23. The venturi 69D having dimensions $D_v$ (diameter at venturi inlet), $D_{vt}$ (diameter of venturi throat), and $\theta$ (angle of cone formed by projection of convergent venturi walls) is placed in the collinear section 66D of the outlet 65D to greatly improve deaeration of solids. The embodiment of FIG. 24 is a variation of the separator shown in FIG. 23. Here, inlet 32D and outlet 33D are oriented for use in a riser type reactor. Solids are propelled to the wall 71D and the bed thus formed is kept in place by the force of the incoming stream. As in the other embodiments, the gas portion of the feed follows the U-shaped pattern of line 45D. However, an asymptotic bed will be formed unless there is a restriction in the solids outlet. A weir would be ineffective in establishing bed height, and would deflect solids into the gas outlet. For this reason the solids outlet of FIG. 23 is preferred. Most preferably, the venturi 69D is placed in collinear section 66D as shown in FIG. 24 to improve the deaeration of the solids. Of course, each of these alternate embodiments may have one or more of the optional design features of the basic separator discussed in relation to FIGS. 16, 17 and 18.

The separator of the present invention is more clearly illustrated and explained by the examples which follow. In these examples, which are based on data obtained during experimental testing of the separator design, the separator has critical dimensions specified in Table I. These dimensions (in inches except as noted) are indicated in the various drawing FIGURES and listed in the Nomenclature below:

CL: Distance between inlet and gas outlet centerlines
$D_i$: Inside diameter of inlet
$D_{og}$: Inside diameter of gas outlet
$D_{os}$: Inside diameter of solids outlet
$D_v$: Diameter of venturi inlet
$D_{vt}$: Diameter of venturi throat
H: Height of flow path
$H_w$: Height of weir or step
L: Length from gas outlet to weir or step as indicated in FIG. 20
W: Width of flow path
$\theta$: Angle of cone formed by projection of convergent venturi walls, degrees

TABLE I

| | Dimensions of Separators in Examples 1 to 10, in inches* | | | | | | | | | |
|---|---|---|---|---|---|---|---|---|---|---|
| | Examples | | | | | | | | | |
| Dimension | 1 | 2 | 3 | 4 | 5 | 6 | 7 | 8 | 9 | 10 |
| Cl | 3.875 | 3.875 | 3.875 | 3.875 | 5.875 | 5.875 | 11 | 11 | 3.5 | 3.5 |
| $D_i$ | 2 | 2 | 2 | 2 | 2 | 2 | 6 | 6 | 2 | 2 |
| $D_{og}$ | 1.75 | 1.75 | 1.75 | 1.75 | 1.75 | 1.75 | 4 | 4 | 1 | 1 |
| $D_{os}$ | 2 | 2 | 2 | 2 | 2 | 2 | 6 | 6 | 2 | 2 |
| $D_v$ | — | — | — | — | — | — | — | — | — | 2 |
| $D_{vt}$ | — | — | — | — | — | — | — | — | — | 1 |
| H | 4 | 4 | 4 | 4 | 4 | 4 | 12 | 12 | 7.5 | 6.75 |
| $H_w$ | 0.75 | 0.75 | 0.75 | 0.75 | 0.75 | 0.75 | 2.25 | 2.25 | 0 | 4.75 |
| L | 0 | 2 | 2 | 0 | 0 | 0 | 0 | 0 | 10 | 0 |
| W | 2 | 2 | 2 | 2 | 2 | 2 | 6 | 6 | 2 | 2 |
| $\theta$, degrees | — | — | — | — | — | — | — | — | — | 28 |

*Except as noted

EXAMPLE 1

In this example a separator of the preferred embodiment of FIG. 16 was tested on a feed mixture of air and silica alumina. The dimensions of the apparatus are specified in Table I. Note that the distance L from the gas outlet to the weir was zero.

The inlet stream was comprised of 85 ft.$^3$/min. of air and 52 lbs./min. of silica alumina having a bulk density of 70 lbs./ft$^3$ and an average particle size of 100 microns. The stream density was 0.612 lbs./ft.$^3$ and the operation was performed at ambient temperature and atmospheric pressure. The velocity of the incoming stream through the 2 inch inlet was 65.5 ft./sec., while the outlet gas velocity was 85.6 ft./sec. through a 1.75 inch diameter outlet. A positive seal of solids in the solids outlet prevented gas from being entrained in the solids leaving the separator. Bed solids were stabilized by placing a 0.75 inch weir across the flow path.

The observed separation efficiency was 89.1%, and was accomplished in a gas phase residence time of approximately 0.008 seconds. Efficiency is defined as the percent removal of solids from the inlet stream.

EXAMPLE 2

The gas-solids mixture of Example 1 was processed in a separator having a configuration illustrated by FIG. 20. In the example the L dimension is 2 inches; all other dimensions are the same as Example 1. By extending the separation chamber along its longitudinal dimension, the flow pattern of the gas began to deviate from the U-shaped discussed above. As a result residence time was longer and turbulence was increased. Separation efficiency for this example was 70.8%.

EXAMPLE 3

The separator of Example 2 was tested with an inlet stream comprised of 85 ft.$^3$/min. of air and 102 lbs./min. of silica alumina which gave a stream density of 1.18 lbs./ft.$^3$, or approximately twice that of Example 2. Separation efficiency improved to 83.8%.

EXAMPLE 4

The preferred separator of Example 1 was tested at the inlet flow rate of Example 3. Efficiency increased slightly to 91.3%.

EXAMPLE 5

The separator of FIG. 16 was tested at the conditions of Example 1. Although the separation dimensions are specified in Table I note that the distance CL between inlet and gas outlet centerlines was 5.875 inches, or about three times the diameter of the inlet. This dimension is outside the most preferred range for CL which is between 1.50 and 2.50 Di. Residence time increased to 0.01 seconds, while efficiency was 73.0%.

EXAMPLE 6

Same conditions apply as for Example 5 except that the solids loading was increased to 102 lbs./min. to give a stream density of 1.18 lbs./ft.$^3$. As observed previously in Examples 3 and 4, the separator efficiency increased with higher solids loading to 90.6%.

EXAMPLE 7

The preferred separator configuration of FIG. 16 was tested in this Example. However, in this example the apparatus was increased in size over the previous examples by a factor of nine based on flow area. A 6 inch inlet and 4 inch outlet were used to process 472 ft.$^3$/min. of air and 661 lbs./min. of silica alumina at 180° F. and 12 psig. The respective velocities were 40 and 90 ft./sec. The solids had a bulk density of 70 lbs./ft$^3$ and the stream density was 1.37 lbs./ft.$^3$ Distance CL between inlet and gas outlet centerlines was 11 inches, or 1.83 times the inlet diameter; distance L was zero. The bed was stabilized by a 2.25 inch weir, and gas loss was prevented by a positive seal of solids. However, the solids were collected in a closed vessel, and the pressure differential was such that a positive flow of displaced gas from the collection vessel to the separator was observed. This volume was approximately 9.4 ft.$^3$/min. Observed separator efficiency was 90.0%, and the gas phase residence time was approximately 0.02 seconds.

EXAMPLE 8

The separator used in Example 7 was tested with an identical feed of gas and solids. However, the solids collection vessel was vented to the atmosphere and the pressure differential adjusted such that 9% of the feed gas, or 42.5 ft.$^3$/min. exited through the solids outlet at a velocity of 3.6 ft./sec. Separator efficiency increased with this positive bleed through the solids outlet to 98.1%.

EXAMPLE 9

The separator of FIG. 22 was tested in a unit having a 2 inch inlet and a 1 inch gas outlet. The solids outlet was 2 inches in diameter and was located 10 inches away from the gas outlet (dimension L). A weir was not used. The feed was comprised of 85 ft.$^3$/min. of air and 105 lbs./min. of spent fluid catalytic cracker catalyst having a bulk density of 45 lbs./ft.$^3$ and an average particle size of 50 microns. This gave a stream density of 1.20 lbs./ft.$^3$ Gas inlet velocity was 65 ft./sec. while the gas outlet velocity was 262 ft./sec. As in Example 7 there was a positive counter-current flow of displaced gas from the collection vessel to the separator. This flow was approximately 1.7 ft.$^3$/min. at a velocity of 1.3 ft./sec. Operation was at ambient temperature and atmospheric pressure. Separator efficiency was 95.0%.

EXAMPLE 10

The separator of FIG. 23 was tested on a feed comprised of 85 ft.$^3$/min. of air and 78 lbs./min. of spent Fluid Catalytic Cracking catalyst. The inlet was 2 inches in diameter which resulted in a velocity of 65 ft./sec., the gas outlet was 1 inch in diameter which resulted in an outlet velocity of 262 ft./sec. This separator had a stepped solids outlet with a venturi in the collinear section of the outlet. The venturi mouth was 2 inches in diameter, while the throat was 1 inch. A cone of 28.1° was formed by projection of the convergent walls of the venturi. An observed efficiency of 92.6% was measured, and the solids leaving the separator were completely deaerated except for interstitial gas remaining in the solids' voids.

(e) Improved Solids Quench Boiler and Process

Figure 25:
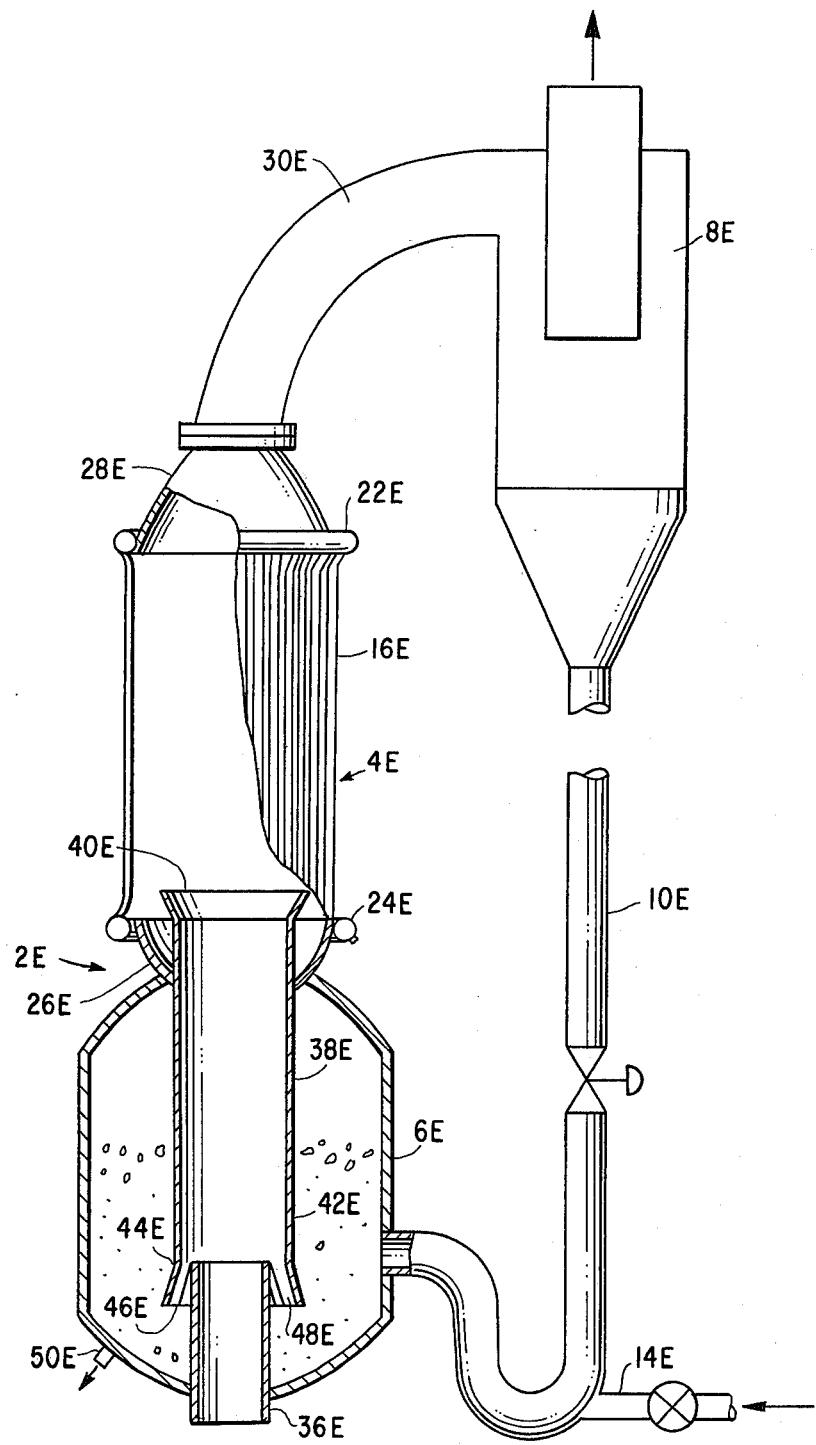
FIG. 25 is a sectional elevational view of the solids quench boiler using the quench riser.

As seen in FIG. 25, in lieu of quench zone 44, 46 (see FIG. 1) of the prior art, the composite solids quench boiler 2E of the subject invention is comprised essentially of a quench exchanger 4E, a fluid bed-quench riser 6E, a cyclone separator 8E with a solids return line 10E to the fluid bed-riser 6E and a line 36E for the delivery of gas to the fluid bed-quench riser.

Figure 26:
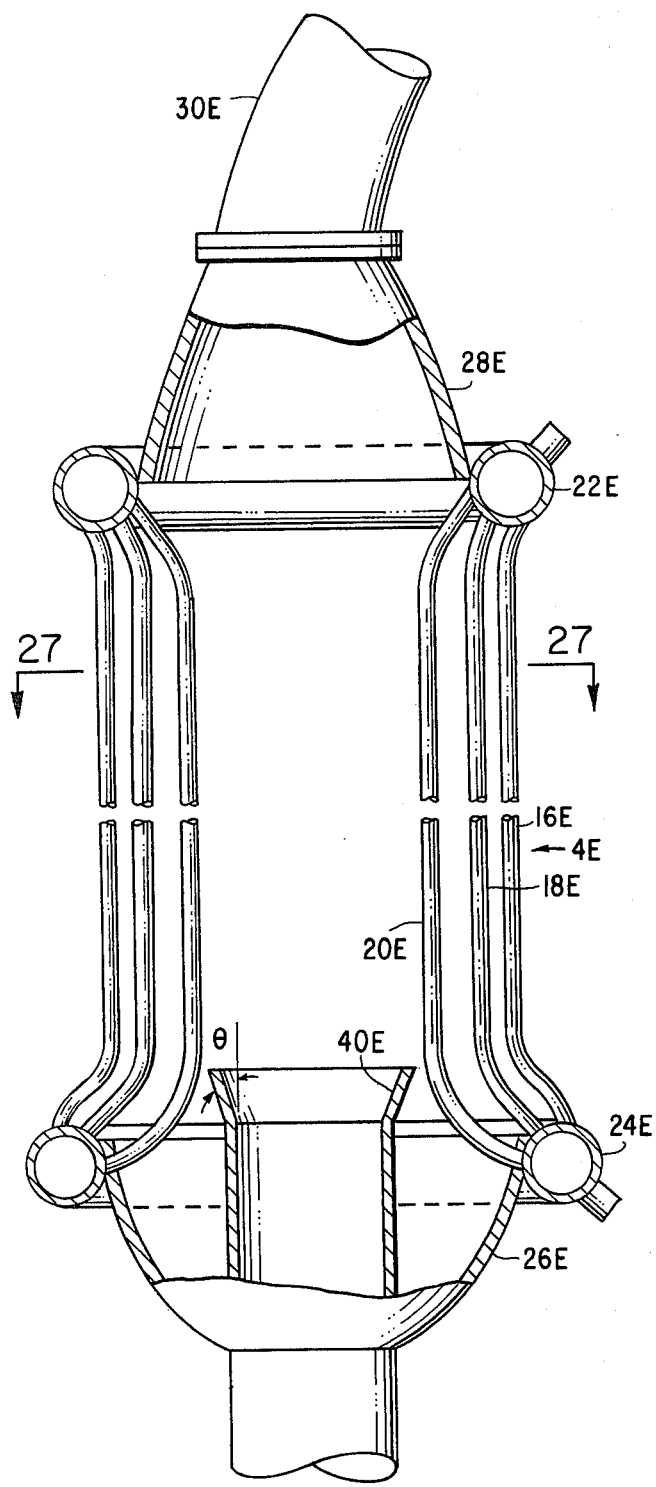
FIG. 26 is a detailed cross sectional elevational view of the quench exchanger of the system.
Figure 27:
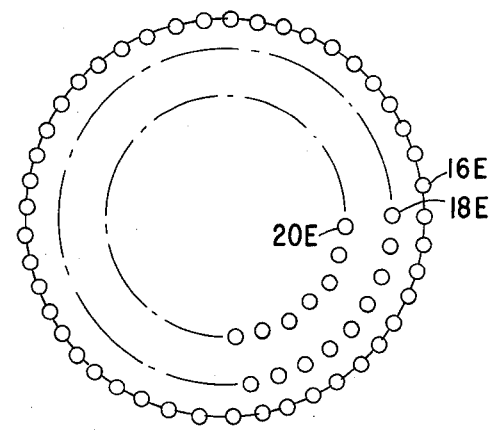
FIG. 27 is a cross sectional plan view taken through line 27—27 of FIG. 26.

The quench exchanger 4E as best seen in FIGS. 26 and 27, is formed with a plurality of concentrically arranged tubes extending parallel to the longitudinal axis of the quench exchanger 4E. The outer circle of tubes 16E form the outside wall of the quench exchanger 4E. The tubes 16E are joined together, preferably by welding, and form a pressure-tight membrane wall which is in effect, the outer wall of the quench exchanger 4E. The inner circles of tubes 18E and 20E are spaced apart and allow for the passage of effluent gas and particulate solids therearound. The arrays of tubes 16E, 18E and 20E are manifolded to an inlet torus 24E to which boiler feed water is delivered and an upper discharge torus 22E from which high pressure steam is discharged for system service. The quench exchanger 4E is provided with an inlet hood 26E and an outlet hood 28E, to insure a pressure tight vessel. The quench exchanger inlet hood 26E extends from the quench riser 6E to the lower torus 24E. The quench exchanger outlet hood 28E extends from the upper torus 22E and is connected to the downstream piping equipment by piping such as an elbow 30E which is arranged to deliver the cooled effluent and particulate solids to the cyclone separator 8E.

The fluid bed quench riser 6E is essentially a sealed vessel attached in sealed relationship to the quench exchanger 4E. The fluid bed-quench riser 6E is arranged to receive the reactor outlet tube 36E which is preferably centrally disposed at the bottom of the fluid quench riser 6E. A slightly enlarged centrally disposed tube 38E is aligned with the reactor outlet 36E and extends from the fluid bed-quench riser 6E into the quench exchanger 4E. In the quench exchanger 4E, the centrally disposed fluid bed-quench riser tube 38E terminates in a conical opening 40E. The conical opening 40E is provided to facilitate nonturbulent transition from the quench riser tube 38E to the enlarged opening of the quench exchanger 4E. It has been found that the angle of the cone $\theta$, best seen in FIG. 26, should be not greater than 10 degrees.

The fluid bed 42E contained in the fluid bed quench riser 4E is maintained at a level well above the bottom of the quench riser tube 38E. A bleed line 50E is provided to bleed solids from the bed 42E. Although virtually any particulate solids can be used to provide the quench bed 42E, it has been found in practice that the same solids used in the reactor are preferably used in the fluidized bed 42E. Illustrations of the suitable particulate solids are FCC alumina solids.

Figure 28:
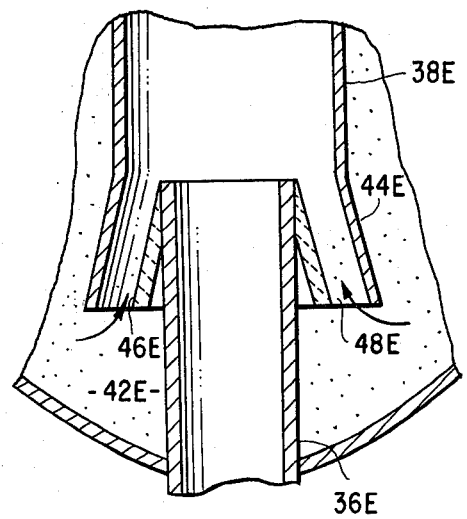
FIG. 28 is a detailed drawing of the reactor outlet and fluid bed quench riser particle entry area.

As best seen in FIG. 28, the opening 48E through which the fluidized particles from the bed 42E are drawn into the quench riser tube 38E is defined by the interior of a cone 44E at the lower end of the quench riser tube 38E and a refractory cone 46E located on the outer surface of the reactor outlet tube 36E. In practice, it has been found that the refractory cone 46E can be formed of any refractory material. The opening 48E, defined by the conical end 44E of the quench riser tube 38E and the refractory cone 46E, is preferably 3-4 square feet for a unit of 50 MMBTU/HR capacity. The opening is sized to insure penetration of the cracked gas at mass velocity of 100 to 800 pounds per second per square foot. The amount of solids from bed 42E delivered to the tube 38E is a function of the velocity of the gas and solids entering the tube 38E from the reactor outlet 36E and the size of the opening 48E.

In practice, it has been found that the Thermal Regenerative Cracking (TRC) reactor effluent will contain approximately 2 pounds of solids per pound of gas at a temperature of about 1,400° F. to 1,600° F.

The process of the solids quench boiler 2E of FIGS. 25-28 is illustrated by the following example. Effluent from a TRC outlet 36E at about 1,500° F. is delivered to the quench riser tube 38E at a velocity of approximately 40 to 100 feet per second. The ratio of particulate solids to cracked effluent entering or leaving the tube 36E is approximately two pounds of solid per pound of gas at a temperature of about 1,500° F. At 70 to 100 feet per second the particulate solids entrained into the effluent stream by the eductor effect is between twenty five and fifty pounds solid per pound of gas. In 5 milliseconds the addition of the particulate solids from the bed 42E which is at a temperature of 1,000° F. reduces the temperature of the composite effluent and solids to 1,030° F. The gas-solids mixture is passed from the quench riser tube 38E to the quench exchanger 4E wherein the temperature is reduced from 1,030° F. to 1,000° F. by indirect heat exchange with the boiler feed water in the tubes 16E, 18E, and 20E. With 120,000 pounds of effluent per hour, 50 MMBTUs per hour of steam at 1,500 PSIG and 600° F. will be generated for system service. The pressure drop of the gas-solids mixture passing through quench exchanger 4E is 1.5 PSI. The cooled gas-solids mixture is delivered through line 30E to the cyclone separator 8E wherein the bulk of the solids is removed from the quenched-cracked gas and returned through line 10E to the quench riser 6E.

(f) Improved Preheat Vaporization System

Figure 29:
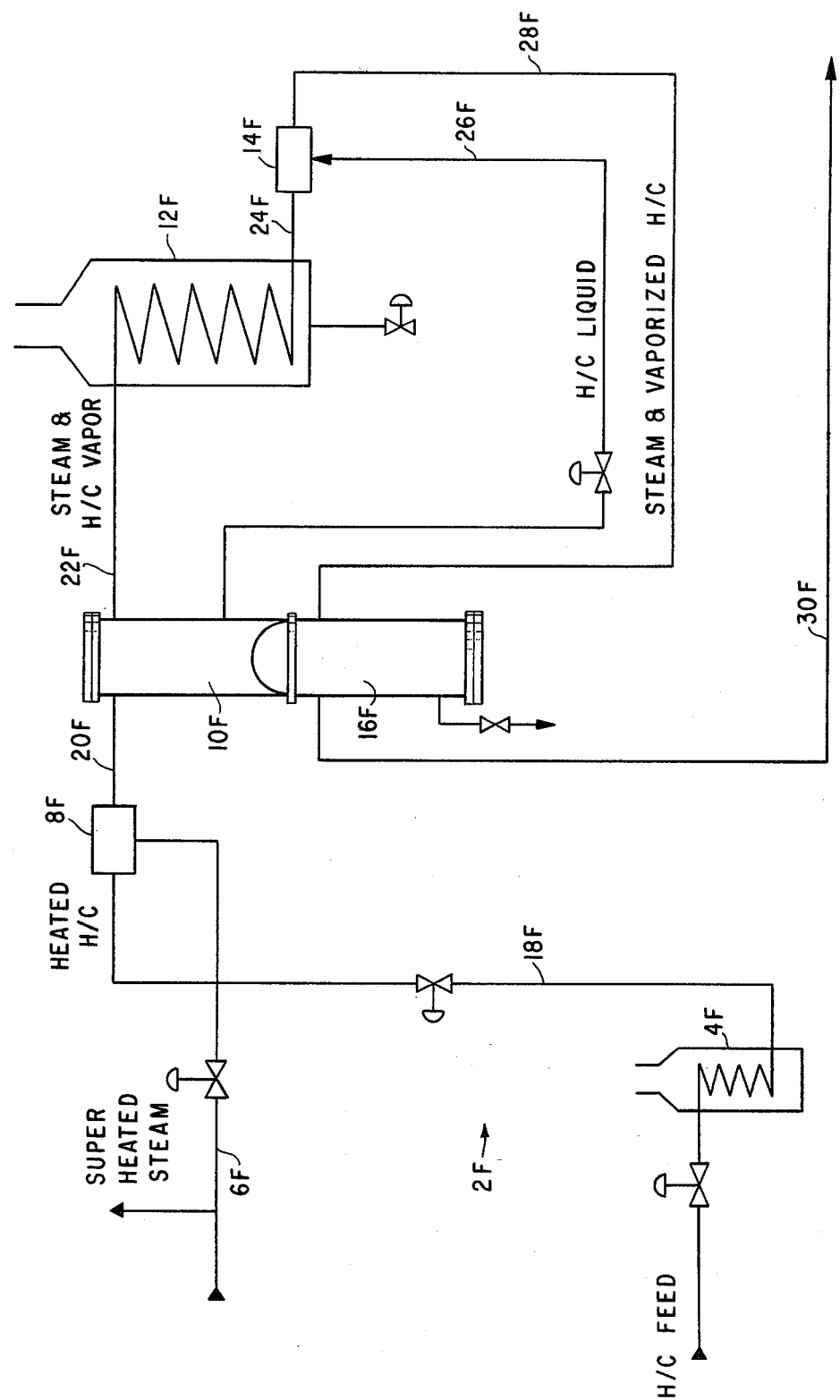
FIG. 29 is a schematic diagram of the system of the invention for vaporizing heavy oil.

Again referring to FIG. 29, in lieu of preheat zone 24 (FIG. 1) of the system, Preheat Vaporization system 2F of the subject invention is embodied in a TRC system and is comprised of essentially a liquid feed heater 4F, a mixer 8F for flashing steam and the heated feedstock, a separator 10F to separate the flashed gas and liquid, a vapor feed superheater 12F, and a second mixer 14F for flashing. The system also preferentially includes a knockout drum 16F for the preheated vapor.

The liquid feed heater 4F is provided for heating the hydrocarbon feedstock such as desulfurized Kuwait HGO to initially elevate the temperature of the feedstock.

The initial mixer 8F is used in the system 2F to initially flash superheated steam from a steam line 6F and the heated feedstock delivered from the liquid feed heater 4F by a line 18F.

The system separator 10F is to separate the liquid and vapor produced by flashing in the mixer 8F. Separated gas is discharged through a line 22F from the separator overhead and the remaining liquid is discharged through a line 26F.

A vapor feed superheater 12F heats the gaseous overhead from the line 22F to a high temperature and discharges the heated vapor through a line 24F.

The second mixer 14F is provided to flash the vaporized gaseous discharge from the vapor feed superheater 12F and the liquid bottoms from the separator 10F, thereby vaporizing the composite steam and feed initially delivered to the system 2F.

A knockout drum 16F is employed to remove any liquid from the flashed vapor discharged from the second mixer 14F through the line 28F. The liquid-free vapor is delivered to a reactor through the line 30F.

In the subject process, the heavy oil liquid hydrocarbon feedstock is first heated in the liquid feed heater 4F to a temperature of about 440° to 700° F. The heated heavy oil hydrocarbon feedstock is then delivered through the line 18F to the mixer 8F. Superheated steam from the line 6F is mixed with the heated heavy oil hydrocarbon feedstock in the mixer 8F and the steam-heavy oil mixture is flashed to about 700° to 800° F. For lighter feedstock the flashing temperature will be about 500° to 600° F., and for heavier feedstock the flashing temperature will be about 700° to 900° F.

The flashed mixture of the steam and hydrocarbon is sent to the system separator 10F wherein the vapor or gas is taken overhead through the line 22F and the liquid is discharged through the line 26F. Both the overhead vapor and liquid bottoms are in the temperature range of about 700° to 800° F. The temperature level and percent of hydrocarbon vaporized are determined within the limits of equipment fouling criteria. The vapor stream in the line 22F is comprised of essentially all of the steam delivered to the system 2F and a large portion of the heavy oil hydrocarbon feedstock. Between 30% and 70% of the heavy oil hydrocarbon feedstock supplied to the system will be contained in the overhead leaving the separator 10F through the line 22F.

The steam-hydrocarbon vapor in the line 22F is delivered to the system vapor feed superheater 12F wherein it is heated to about 1,030° F. The heated vapor is taken from the vapor feed superheater 12F through the line 24F and sent to the second mixer 14F. Liquid bottoms from the separator 10F is also delivered to the second mixer 14F and the vapor-liquid mix is flashed in the mixer 14F to a temperature of about 1,000° F.

The flashed vapor is then sent downstream through the line 28F to the knockout drum 16F for removal of any liquid from the vapor. Finally, the vaporized hydrocarbon feed is sent through the line 30F to a reactor.

An illustration of the system preheat process is seen in the following example.

A Nigerian Heavy Gas Oil is preheated and vaporized in the system 2F prior to delivery to a reactor. The Nigerian Heavy Gas Oil has the following composition and properties:

| Elemental analysis | Wt. % | Properties | |
|---|---|---|---|
| Carbon | 86.69 | Flash Point, F. | 230.0 |
| Hydrogen | 12.69 | Viscosity, SUS 210 F | 44.2 |
| Sulfur | .10 | Pour Point, F | +90.0 |
| Nitrogen | .047 | Carbon Residue, Ramsbottom | .09 |
| Nickel | .10 | Aniline Point, C | 87.0 |
| Vanadium | .10 | | |

| Distillation Vol. % | |
|---|---|
| IBP | |
| 10 | 669.2 |
| 30 | 755.6 |
| 50 | 820.4 |
| 70 | 874.4 |
| 90 | 944.6 |
| EP | 1,005.8 |

3,108 pounds per hour of the Nigerian Heavy Gas Oil is heated to 750° F. in the liquid feed heater 4F and delivered at a pressure of 150 psia to the mixer 8F. 622 pounds per hour of superheated steam at 1,100° F. is simultaneously delivered to the mixer 8F. The pressure in the mixer is 50 psia.

The superheated steam and Heavy Gas Oil are flashed in the mixer 8F to a temperature of 760° F. wherein 60° of the Heavy Gas Oil is vaporized.

The vapor and liquid from the mixer 8F are separated in the separator 10F. 622 pounds per hour of steam and 1,864.8 pounds per hour of hydrocarbon are taken in line 22F as overhead vapor. 1,243.2 pounds per hour of hydrocarbon are discharged through the line 26F as liquid and sent to the mixer 14F.

The mixture of 622 pounds per hour of steam and 1,864.8 pounds per hour of hydrocarbon are superheated in the vapor superheater 12F to 1,139° F. and delivered through line 24F to the mixer 14F. The mixer 14F is maintained at 45 psia.

The 1,243.2 pounds per hour of liquid at 760° F. and the vaporous mixture of 622 pounds per hour of steam and 1,864.8 pound per hour of hydrocarbon are flashed in the mixer 14F to 990° F.

The vaporization of the hydrocarbon is effected with a steam to hydrocarbon ratio of 0.2. The heat necessary to vaporize the hydrocarbon and generate the necessary steam is 2.924 MM BTU/hr.

The same 3,108 pounds per hour of Nigerian Heavy Gas Oil feedback vaporized by a conventional flashing operation requires steam in a 1:1 ratio to maintain a steam temperature of 1,434° F. The composite heat to vaporize the hydrocarbon and generate the necessary steam is 6.541 MM BTU/hr. In order to reduce the input energy in the conventional process to the same level as the present invention, a steam temperature of 3,208° F. is required, which temperature is effectively beyond design limitations.

SUMMARY

With reference to the new and improved separation (see FIGS. 15-24), it is noted that short residence time favors selectivity in $C_2H_4$ production. This means that the reaction must be quenched rapidly. When solids are used, they must be separated from the gas rapidly or quenched with the gas. If the gases and solids are not separated rapidly (but separated) as in a cyclone, and then quenched, product degradation will occur. If the total mix is quenched, to avoid rapid separation, a high thermal inefficiency will result since all the heat of the solids will be rejected to some lower level heat recovery. Thus, a rapid high efficiency separator, according to the subject invention, is optimal for a TRC process.

Similarly, in connection with the subject solids feed device (see FIGS. 4-13), it is noted that in order to feed solids to an ethylene reactor, the flow must be controlled to within ±2 percent or cracking severity oscillations will be greater than that presently experienced in coil cracking. The subject feed device (local fluidization) minimizes bed height as a variable and dampens the effect of over bed pressure fluctuations, both of which contribute to flow fluctuations. It is thus uniquely suited to short residence time reactions. Further, for short residence time reactions, the rapid and intimate mixing are critical in obtaining good selectivity (minimize mixing time as a percentage of total reacting time). Both of the features permit the TRC to move to shorter residence times which increase selectivity. Conventional fluid bed feeding devices are adequate for longer time and lower temperature reactions (FCC) especially catalytic reactions where minimal reaction occurs if the solids are not contacting the gas (poor mixing).

In connection with the solids quench boiler (see FIGS. 25-28), in the current TRC concept, a 90 percent separation occurs in the primary separator. This is followed by an oil quench to 1,300° F., and a cyclone to remove the remainder of the solids. The mix is then quenched again with liquid to 600° F. Thus, all the available heat from the reaction outlet temperature to 600° F. is rejected to a circulating oil stream. Steam is generated from the oil at 600 psig, 500° F. This scheme is used to avoid exchanger fouling when cracking heavy feeds at low steam dilutions and high severities in the TRC process. However, instead of an oil quench, a circulating solids stream could be used to quench the effluent. As in the reaction itself, the coke would be deposited preferentially on the solids thus avoiding fouling. These solids can be held at 800° F. or above, thus permitting the generation of high pressure steam (1500 psig+) which increases the overall thermal efficiency of the process. The oil loop can not operate at these temperatures due to instabilities (too many light fractions are boiled off, yielding an oil that is too viscous). The use of solids has application in both TRC or a coil, but it is especially suited to a TRC process since the TRC process uses solids. During quenching, the coke accumulates on the solid. It must be burned off. In a coil application, it would have to be burned off in a separate vessel while in a TRC the regenerator that already exists is available.

With reference to the preheat vaporization system of the subject invention (see FIG. 29), it is noted that the TRC has maximum economic advantages when cracking heavy feedstocks (650F.+ boiling point) at low steam dilutions. Selectivity is favored by rapid and intimate mixing. Rapid and intimate mixing is best accomplished with a vapor feed rather than a liquid feed.

Finally, with reference to the sequential cracking system of the invention (see FIG. 14), it is clear that sequential cracking represents an alternative way of utilizing the heat available in the quench (as opposed to the solids quench boiler) in addition to any yield advantages. It can be applied to both TRC and a coil. Its synergism with TRC is that it permits the use of longer solids/gas separation times if the second feed is added prior to any separation. The high amount of heat available in the solids permits the use of lower temperatures compared to the coil case.

While there have been described what is considered to be preferred embodiments of the invention, variations and modifications therein will occur to those skilled in the art once they become acquainted with the basic concepts of the invention. Therefore, it is intended that the appended claims shall be construed to include not only the disclosed embodiments but all such variations and modifications that fall within the true spirit and scope of the invention.

We claim:

1. In a TRC process wherein the temperature in the cracking zone is between 1300° and 2500° F. and wherein the hydrocarbon feed or the hydrodesulfurization residual oil along with the entrained inert solids and the diluent gas are passed through the cracking zone for a residence time of 0.05 to 2 seconds, the improvements comprising:
    (1) the process for generating fuel oil and removing coke deposits on said solids comprising the steps of:
        (a) generating a fuel gas from fuel and air;
        (b) delivering the fuel gas to a transfer line;
        (c) mixing the particulate solids with the fuel gas in the transfer line to elevate the temperature of the solids; and
        (d) combusting the fuel gas in the transfer line to elevate the temperature of the solids and remove the coke from the solids; and
    (2) the process for separating by centrifugal force particulate solids from the dilute mixed phase stream of gas and solids comprising the steps of:
        (a) adding the mixed phase stream to a chamber having a flow path of essentially rectangular cross section from an inlet of inside diameter $D_i$ disposed normal to the flow path, said flow path having a height H equal to $D_i$ or 4 inches, whichever is greater, and a width W greater than or equal to 0.75 $D_i$ but less than or equal to 1.25 $D_i$, (b) disengaging solids from gas by centrifugal force within said chamber along a bed of solids found at a wall opposite to the inlet as the gas flows through said flow path, the gas changing direction 180°, and the solids being projected 90° toward a solids outlet, (c) withdrawing the gaseous portion of the inlet stream from a gas outlet, disposed 180° from the inlet, the gas portion containing about 20% residual solids, said gas outlet located between the solids outlet and inlet, the gas outlet being at a distance no greater than 4 $D_i$ from the inlet as measured between respective centerlines, and (d) withdrawing the solids by gravity through the solids outlet.

2. In a TRC process as in claim 1, the further improvement wherein the process for mixing the solids rapidly and intimately with the fluid feed in the reaction chamber mixing zone comprises the steps of:
 a. delivering fluidized solids through a conduit to a mixing chamber; and
 b. introducing fluid feed into the stream of solids at an angle.

3. In a TRC process as in claim 1 or 2, the further improvement wherein the step of cracking hydrocarbon feed to produce olefins comprises:
 a. delivering hydrocarbon feed to a first zone;
 b. thermally cracking the hydrocarbons in the first zone at temperatures above 1,500° F.;
 c. discharging the cracked effluent from the first zone to a second zone;
 d. delivering a second hydrocarbon feed to the entry of the second zone; and
 e. mixing the cracked effluent from the first zone and the second hydrocarbon feed in the second zone;
whereby the cracked effluent from the first zone is quenched and the second hydrocarbon feed is cracked at low severity.

4. In a TRC process as in claim 1 further comprising the improvement wherein the process for quenching the reactor effluent comprises the steps of:
 a. introducing particulate solids into the effluent stream; and
 b. passing the composite stream of effluent and particulate solids in indirect heat exchange relationship with a coolant.

5. In a TRC process as in claim 2, the further improvement wherein the process for quenching the reactor effluent comprises the steps of:
 a. introducing particulate solids into the effluent stream; and
 b. passing the composite stream of effluent and particulate solids in indirect heat exchange relationship with a coolant.

6. In a TRC process as in claim 3, the further improvement wherein the process for quenching the reactor effluent comprises the steps of:
 a. introducing particulate solids into the effluent stream; and
 b. passing the composite stream of effluent and particulate solids in indirect heat exchange relationship with a coolant.

7. In a TRC process as in claim 1, the further improvement in the process for preheating the heavy oil hydrocarbon feedstock comprising the steps of:
 a. heating the liquid heavy oil hydrocarbon feedstock;
 b. initially flashing the heated liquid heavy oil hydrocarbon feedstock with steam;
 c. separating the vapor and liquid phases of the flashed liquid heavy oil hydrocarbon feedstock-steam mixture;
 d. superheating the vapor phase of the flashed liquid heavy oil hydrocarbon feedstock-steam mixture; and
 e. flashing the superheated vapor and the liquid phase of the originally flashed liquid heavy oil hydrocarbon feedstock-steam mixture.

8. In a TRC process as in claim 2, the further improvement in the process for preheating the heavy oil hydrocarbon feedstock comprising the steps of:
 a. heating the liquid heavy oil hydrocarbon feedstock;
 b. initially flashing the heated liquid heavy oil hydrocarbon feedstock with steam;
 c. separating the vapor and liquid phases of the flashed liquid heavy oil hydrocarbon feedstock-steam mixture;
 d. superheating the vapor phase of the flashed liquid heavy oil hydrocarbon feedstock-steam mixture; and
 e. flashing the superheated vapor and the liquid phase of the originally flashed liquid heavy oil hydrocarbon feedstock-steam mixture.

9. In a TRC process as in claim 3, the further improvement in the process for preheating the heavy oil hydrocarbon feedstock comprising the steps of:
 a. heating the liquid heavy oil hydrocarbon feedstock;
 b. initially flashing the heated liquid heavy oil hydrocarbon feedstock with steam;
 c. separating the vapor and liquid phases of the flashed liquid heavy oil hydrocarbon feedstock-steam mixture;
 d. superheating the vapor phase of the flashed liquid heavy oil hydrocarbon feedstock-steam mixture; and
 e. flashing the superheated vapor and the liquid phase of the originally flashed liquid heavy oil hydrocarbon feedstock-steam mixture.

10. In a TRC process as in claim 4, the further improvement in the process for preheating the heavy oil hydrocarbon feedstock comprising the steps of:
 a. heating the liquid heavy oil hydrocarbon feedstock;
 b. initially flashing the heated liquid heavy oil hydrocarbon feedstock with steam;
 c. separating the vapor and liquid phases of the flashed liquid heavy oil hydrocarbon feedstock-steam mixture;
 d. superheating the vapor phase of the flashed liquid heavy oil hydrocarbon feedstock-steam mixture; and
 e. flashing the superheated vapor and the liquid phase of the originally flashed liquid heavy oil hydrocarbon feedstock-steam mixture.

11. The process of claim 1 further comprising the step of further separating residual solids from the gaseous portion of the inlet stream removed via the gas outlet in a secondary separator.

12. The process of claims 1 or 11 further comprising the step of stripping solids withdrawn from the solids outlet with the inert gas or steam.

13. The process as in claim 1 further comprising the steps of passing the composite quenched effluent from the second zone through the hot side of an indirect heat exchanger and passing steam through the cold side of the indirect heat exchanger.

14. The process as in claim 1 further comprising the steps of fractionating the cracked effluent and returning a portion of the fractionated cracked effluent to the first zone.

15. A process as in claim 1 wherein the first zone is operated at high severity short residence cracking conditions.

16. A process as in claim 1 wherein the feed delivered to the second zone is virgin gas oil 400° to 650° F.

17. A process as in claim 14 wherein the fraction returned to the first zone is light paraffinic gases of ethane and propane.

18. A process as in claim 1 wherein the hydrocarbon delivered to the first zone is pre-heated to a temperature between 600° and 1,200° F.

19. A process as in claim 1 wherein the hydrocarbon delivered to the second zone is pre-heated to a temperature between 600° and 1,200° F.

20. A process as in claim 15 wherein the kinetic severity function in the first zone is about 3.5.

21. A process as in claim 15 wherein the kinetic severity factor is about 0.5 at about 300 to 400 milliseconds.

22. A process as in claim 1 wherein 100 pounds of hydrocarbon are delivered to the second reaction zone as quench for every 60 pounds of effluent from the primary zone.

23. The process as in claim 1 wherein the coolant is steam and comprising the further step of generating high pressure steam from the coolant during the heat exchange with effluent and particulate solids.

24. The process as in claim 1 wherein the ratio of particulate solids introduced into the effluent stream to the gas in the stream is 25 to 50 pounds of solid per pound of gas.

25. The process as in claim 23 further comprising the steps of separating the quenched cracked gas from the particulate solids and returning the particulate solids to the heat exchanger hot side.

26. The process as in claim 1 wherein the initial flashing of the steam and the liquid heavy oil hydrocarbon is at a temperature of 500° to 900° F., the vapor from the initial flashing is superheated to about 1,100° F. and the superheated vapor and liquid from the initial flashing step is again flashed to about 1,000° F.

27. The process as in claim 26 wherein the liquid heavy oil is preheated to 440° to 700° F.

28. The process as in claim 1 wherein the particulate solids are decoked by the passage with the fuel gas in a vessel at about 100 feet per second and the steam decoking reaction reduces the particulate solids-fuel gas temperature.

29. The process as in claim 1 further comprising the step of combusting the fuel gas in the transfer line to further heat the solids and remove the coke from the solids.

* * * * *